US012436488B2

(12) United States Patent
Minato et al.

(10) Patent No.: US 12,436,488 B2
(45) Date of Patent: Oct. 7, 2025

(54) IMAGE FORMING APPARATUS OPERABLE IN PLURAL MODES TO SET TRANSFER VOLTAGE

(71) Applicant: CANON KABUSHIKI KAISHA, Tokyo (JP)

(72) Inventors: Yusuke Minato, Chiba (JP); Takenori Sueoka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/360,567

(22) Filed: Jul. 27, 2023

(65) Prior Publication Data

US 2023/0367249 A1 Nov. 16, 2023

Related U.S. Application Data

(62) Division of application No. 17/686,660, filed on Mar. 4, 2022, now Pat. No. 11,754,957.

(30) Foreign Application Priority Data

Mar. 31, 2021 (JP) .................................. 2021-059836

(51) Int. Cl.
 *G03G 15/16* (2006.01)
 *G03G 15/00* (2006.01)
 (Continued)

(52) U.S. Cl.
 CPC ....... *G03G 15/5041* (2013.01); *G06K 15/027* (2013.01); *G06K 15/129* (2013.01)

(58) Field of Classification Search
 USPC ........................................................ 399/72
 See application file for complete search history.

(56) References Cited

U.S. PATENT DOCUMENTS 8,843,003 B2    9/2014 Nakao
11,126,115 B2   9/2021 Sueoka
(Continued)

FOREIGN PATENT DOCUMENTS

JP    2013-037185 A    2/2013
JP    2018-004828 A    1/2018
JP    2020-144289 A    9/2020

OTHER PUBLICATIONS

Office Action dated Oct. 15, 2024, in Japanese Patent Application No. 2021-059836.

*Primary Examiner* — Quana Grainger
(74) *Attorney, Agent, or Firm* — Venable LLP

(57) ABSTRACT

An image forming apparatus includes an image bearing member, an image forming portion, a transfer member, a power source, an acquiring portion, and a controller capable of executing an operation in an adjustment mode. A plurality of test toner images transferred onto a recording material in the occurrence in the adjusting mode include a first test toner image transferred under application of a first test voltage and a second test toner image transferred under application of a second test voltage different from the first test voltage. In the operation in the adjustment mode, the controller adjusts the transfer voltage set for transfer on the basis of first information on variation in image density acquired in different regions of the first test toner image and second information on variation in image density acquired in different regions of the second test toner image.

4 Claims, 19 Drawing Sheets

(51) Int. Cl.
*G06K 15/02* (2006.01)
*G06K 15/12* (2006.01)

(56) References Cited

U.S. PATENT DOCUMENTS

| 2020/0166881 A1* | 5/2020 | Omata | G03G 15/5062 |
| 2020/0242426 A1* | 7/2020 | Omata | G06K 15/14 |
| 2020/0285176 A1 | 9/2020 | Sueoka | |

* cited by examiner

| BASIS WEIGHT (g/m²) | WATER CONTENT (g/kg) | | | | |
|---|---|---|---|---|---|
| | ≤0.9 | ... | 8.9 | ... | 21.5≤ |
| * | * | | * | | * |
| 76~90 | 1000V | ... | 500V | ... | 200V |
| 91~105 | 1150V | ... | 600V | ... | 250V |
| 106~128 | 1300V | ... | 700V | ... | 300V |
| * | * | | * | | * |

Fig. 5

| PAPER CATEGORY | B.W.(g/m²) | Vp(n)UPPER LIMIT |
|---|---|---|
| · | · | · |
| · | · | · |
| PLAIN PAPER | 81~100 | 1200V |
| THICK PAPER 1 | 101~125 | 1350V |
| THICK PAPER 2 | 126~150 | 1500V |
| | · | · |
| | · | · |

Fig. 15

IMAGE FORMING APPARATUS OPERABLE IN PLURAL MODES TO SET TRANSFER VOLTAGE

FIELD OF THE INVENTION AND RELATED ART

The present invention relates to an image forming apparatus, such as a printer, a copying machine, a facsimile machine, or a multi-function machine, of an electrophotographic type.

In an image forming apparatus, such as the printer, the copying machine, the facsimile machine, or the multi-function machine, of the electrophotographic type, a toner image formed on an image bearing member such as a photosensitive member or an intermediary transfer member is transferred onto a recording material. The transfer of the toner image from an image bearing member to the recording material is performed by applying a transfer voltage to a transfer member such as a transfer roller which contacts the image bearing member to form a transfer portion (transfer nip). The transfer voltage can be determined based on a transfer portion part voltage corresponding to the electrical resistance of the transfer portion detected during the pre-rotation process before image formation, and a recording material part voltage depending on a kind of the recording material. By doing so, an appropriate transfer voltage can be set according to the environmental fluctuations, the transfer member usage history, the recording material kind, and the like.

However, there are various types and conditions of recording materials used in the image formation, and therefore, the preset recording material part voltage may be higher or lower than the appropriate transfer voltage. Under the circumstances, an image forming apparatus operable in an adjustment mode in which set voltage (value) of a secondary transfer voltage is adjusted depending on the recording material actually used in the image formation is proposed, although in the case of an intermediary transfer type including an intermediary transfer belt as an image bearing member (Japanese Laid-open Patent Application No. 2013-37185). In the operation in the adjusting mode, a plurality of test toner images which are called patches are formed on a single recording material while switching the secondary transfer voltage. The recording material on which the plurality of patches are formed is called an adjusting chart. Then, the recording material part voltage is changed on the basis of an average image density acquired from densities of the respective patches formed on the adjusting chart, whereby the secondary transfer voltage set during image formation is adjusted.

Incidentally, in the above-described conventional image forming apparatus, image defect such that the recording material is electrically discharged in the neighborhood of the secondary transfer portion during secondary transfer and a charge polarity of toner is reversed at an associated portion and the toner is not transferred onto the recording material and results in a white void in a dot shape (hereinafter, called "white void") can occur.

The "white void" is liable to occur with an increasing secondary transfer voltage, and is particularly liable to be visualized on a half-tone black image. In the case of the conventional image forming apparatus in which the set voltage of the secondary transfer voltage is adjusted on the basis of the above-described image density of the patches, there was a liability that the set voltage of the secondary transfer voltage is adjusted to a level (absolute value) at which the white void is caused to occur. In view of this, an image forming apparatus in which an upper limit is provided to the recording material part voltage and in which the secondary transfer voltage set during the image formation within a range in which the occurrence of the "white void" can be suppressed is adjusted, is proposed (Japanese Laid-Open Patent Application No. 2020-144289).

However, conventionally, by providing the upper limit to the recording material part voltage, the "white void" due to an excessively high transfer voltage does not occur, but the transfer voltage was adjusted to a low level to the extent such that image density lowering is caused to occur, in some instances.

SUMMARY OF THE INVENTION

In view of the above-described problem, a principal object of the present invention is to provide an image forming apparatus capable of adjusting a transfer voltage to a transfer voltage at which suppression of occurrence of a "white void" and suppression of occurrence of an "image density lowering" are compatibly realized in the case of a constitution in which an occurrence in an adjusting mode in which the transfer voltage set for image formation on the basis of an adjusting chart is adjusted.

According to an aspect of the present invention, there is provided an image forming apparatus comprising: an image bearing member configured to bear a toner image; an image forming portion configured to form the toner image on the image bearing member; a transfer member configured to transfer the toner image from the image bearing member onto a recording material; a power source configured to apply a transfer voltage, to the transfer member, for transferring the toner image from the image bearing member onto the recording material; an acquiring portion configured to acquire information on an image density of an image transferred on the recording material; and a controller capable of executing an operation in an adjustment mode in which a test chart is outputted by transferring a plurality of test toner images onto the recording material under application of a plurality of different test voltages from the power source and then on the basis of densities of the test toner images transferred on the test chart, the transfer voltage set for transfer of the toner image from the image bearing member onto the recording material is adjusted, wherein the test toner images include a first test toner image transferred onto the recording material under application of a first test voltage and a second test toner image transferred onto the recording material under application of a second test voltage different from the first test voltage, and wherein in the operation in the adjustment mode, the controller adjusts the transfer voltage set for the transfer on the basis of first information on variation in image density acquired in different regions of the first test toner image and second information on variation in image density acquired in different regions of the second test toner image.

Further features of the present invention will become apparent from the following description of exemplary embodiments with reference to the attached drawings.

BRIEF DESCRIPTION OF THE DRAWINGS

FIG. 5 is a table showing table data of a recording material part voltage.

Figure 7:
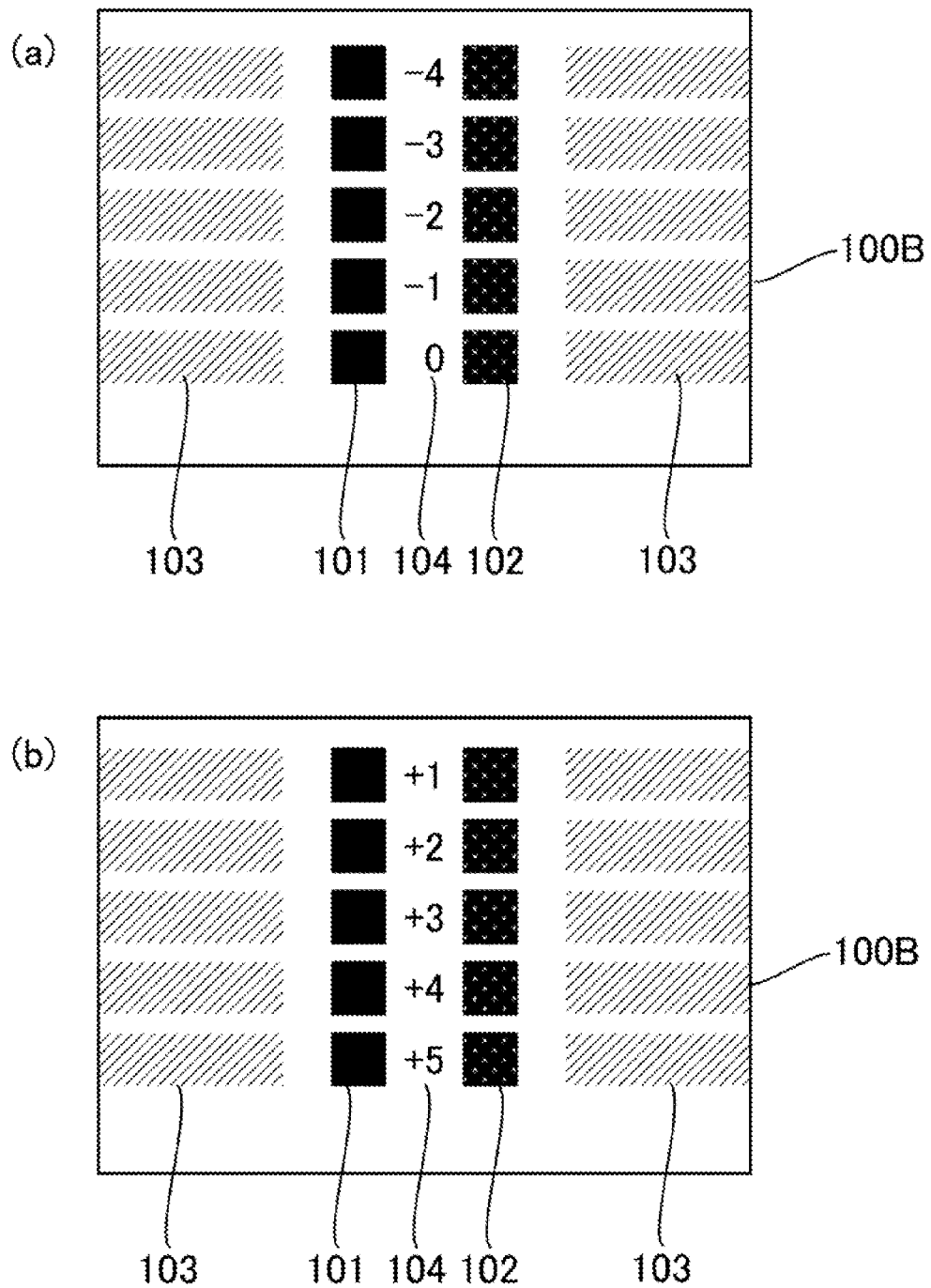

Parts (a) and (b) of FIG. 7 are schematic illustrations of small chart data, in which part (a) shows the small chart data on a first side, and part (b) shows the small chart data on a second side.

Figure 8:
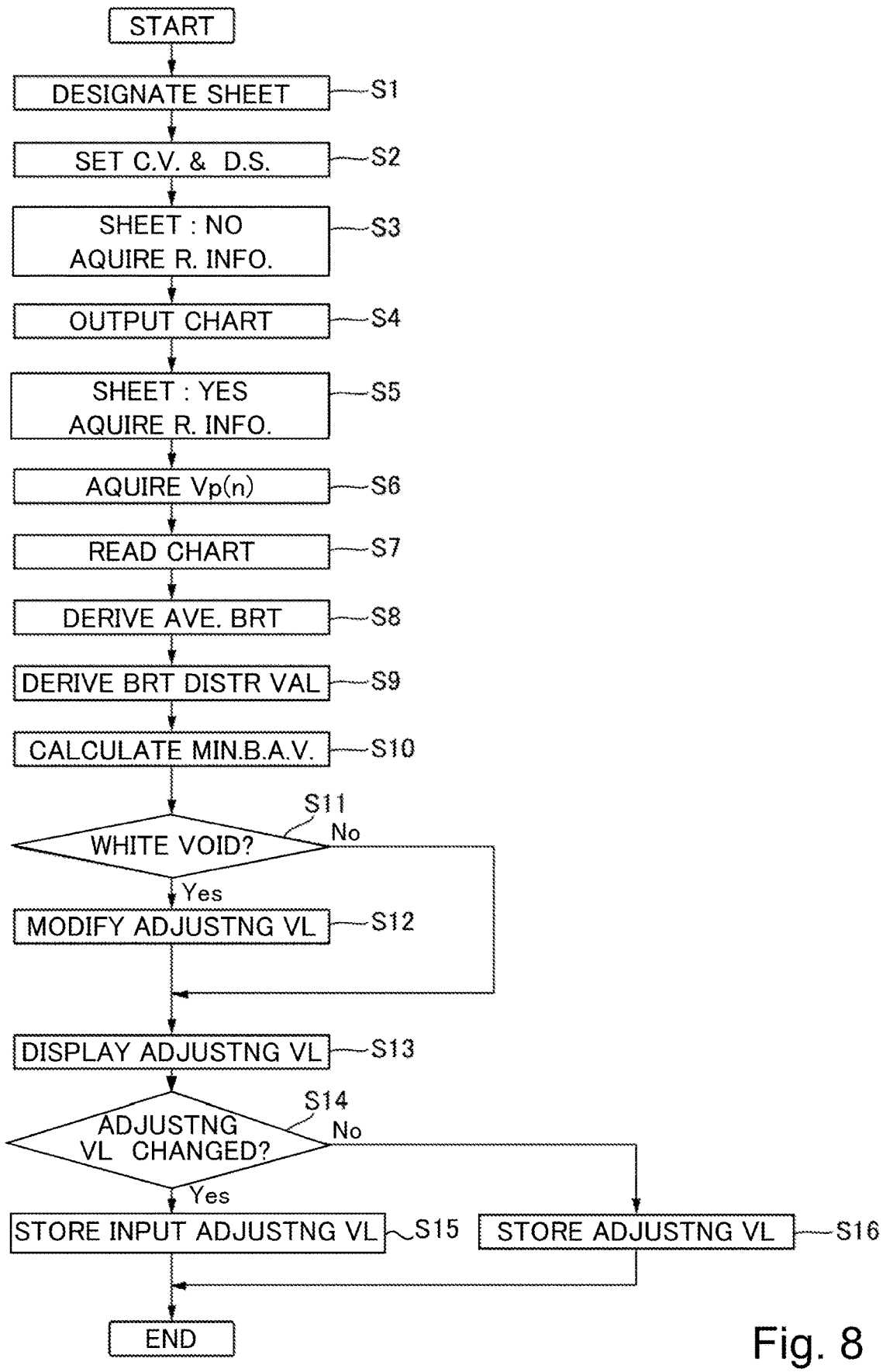

FIG. 8 is a flowchart showing an operation in an adjustment mode in a first embodiment.

Figure 9:
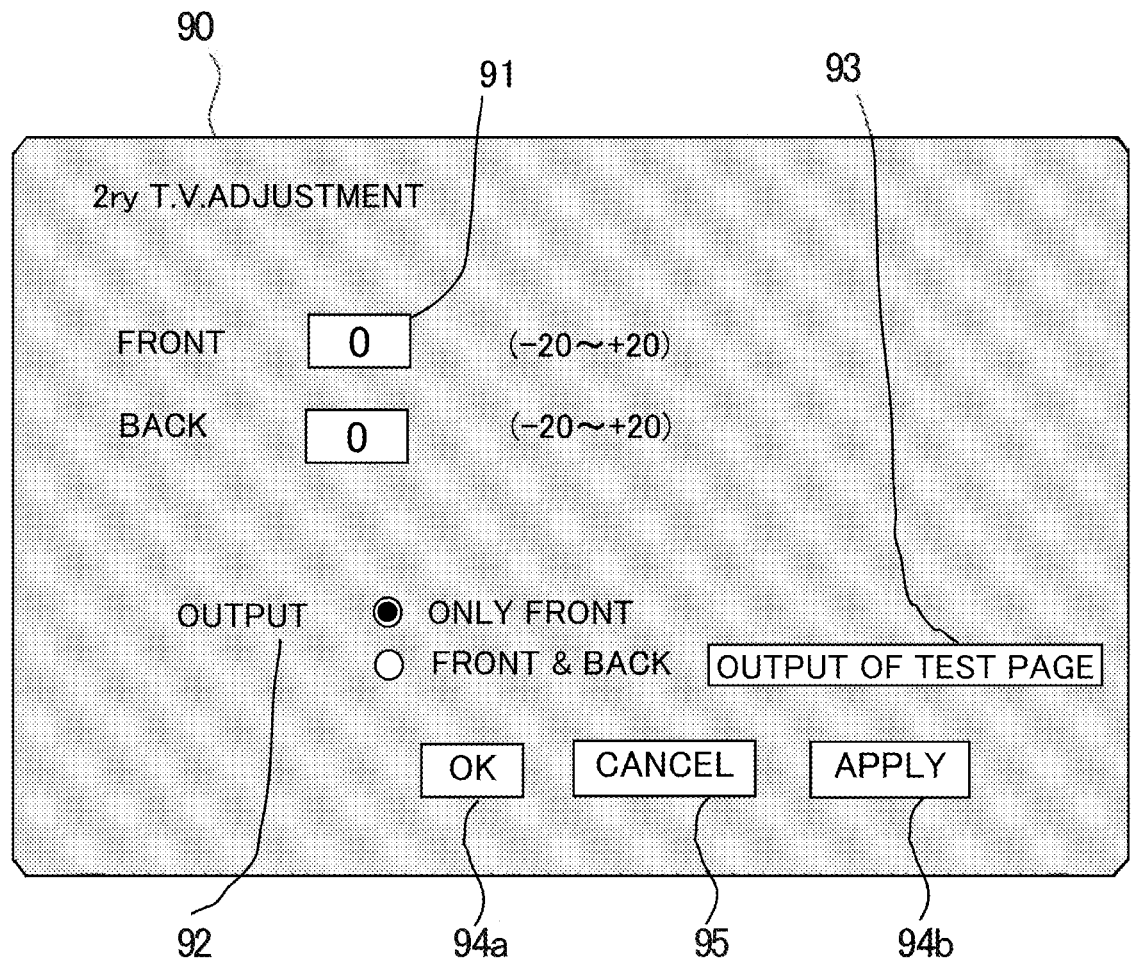

FIG. 9 is a schematic illustration showing a setting screen of a secondary transfer voltage.

Figure 10:
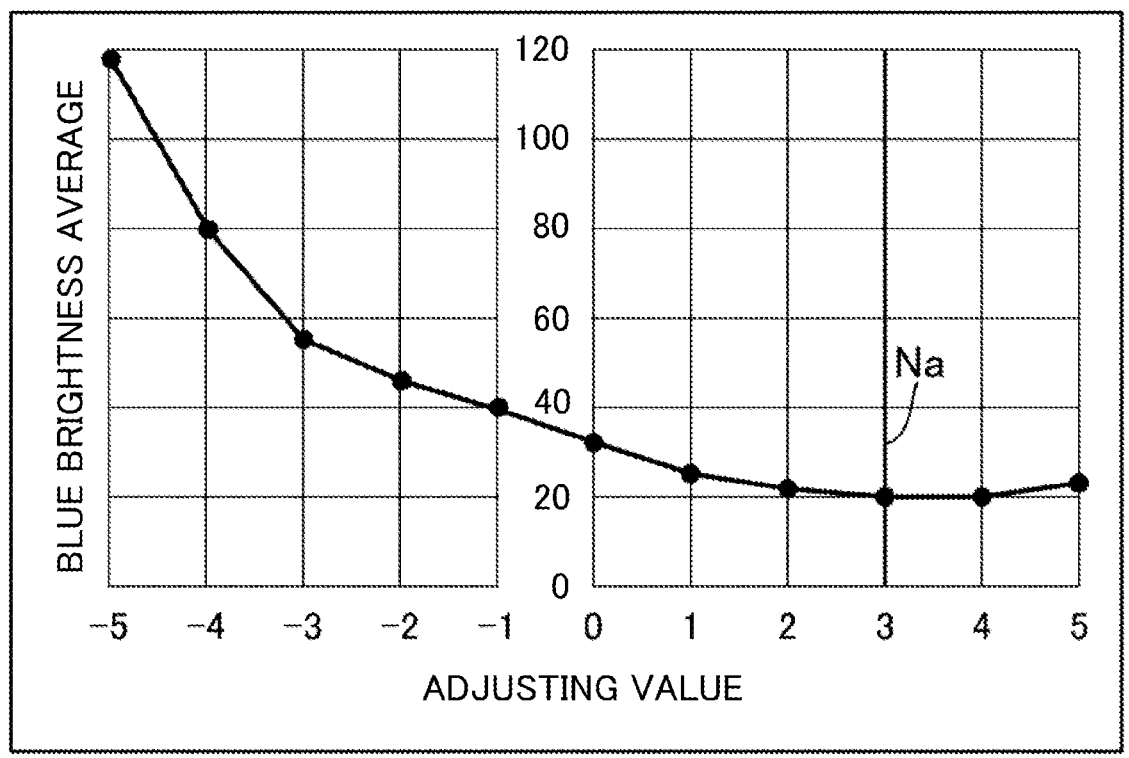

FIG. 10 is a graph showing a relationship between an adjusting value of the secondary transfer voltage and an average of brightness of a patch.

Figure 11:
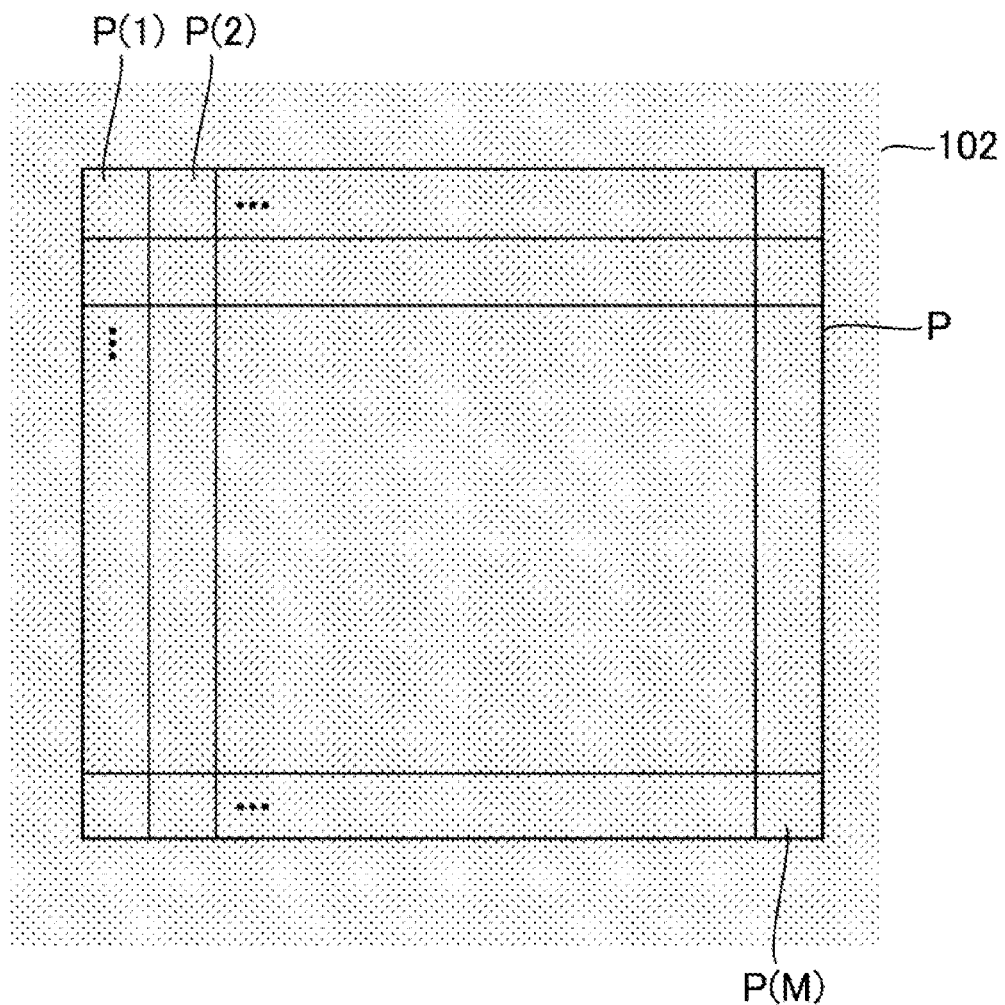

FIG. 11 is a schematic illustration showing a method of acquiring brightness data for calculating a brightness dispersion value.

Figure 12:
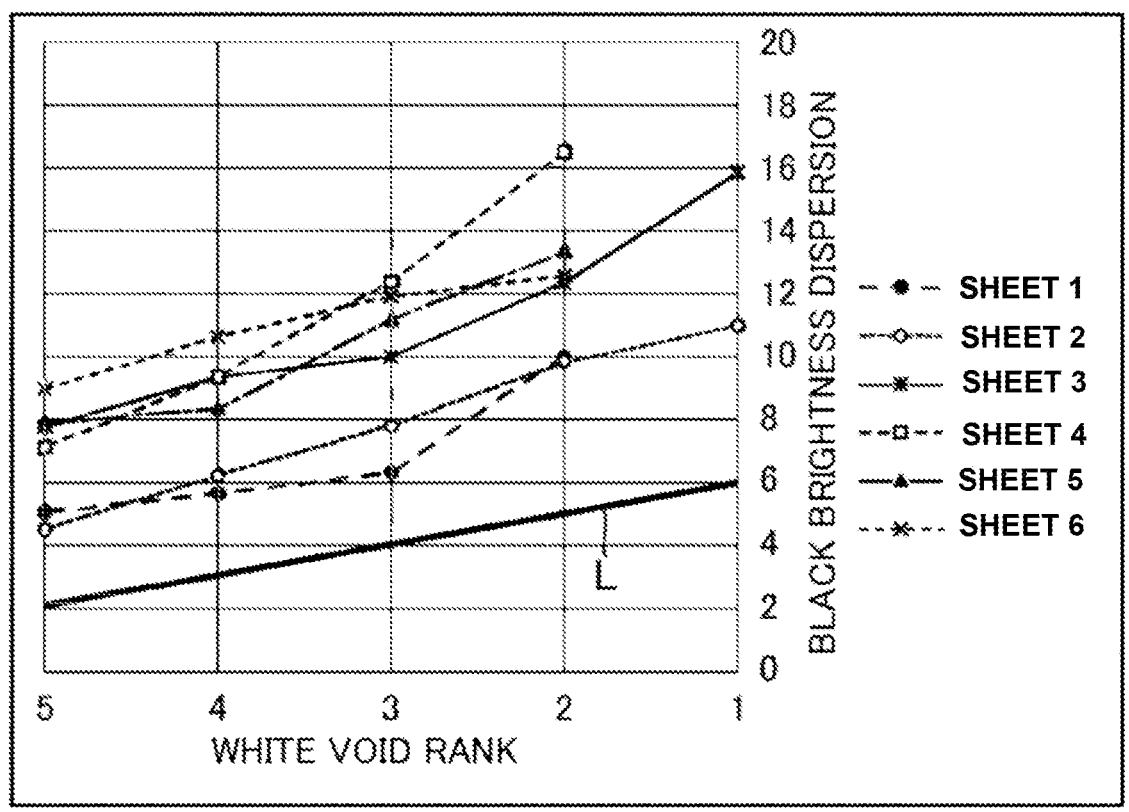

FIG. 12 is a graph for illustrating a relationship between "white void" and the brightness dispersion value.

Figure 13:
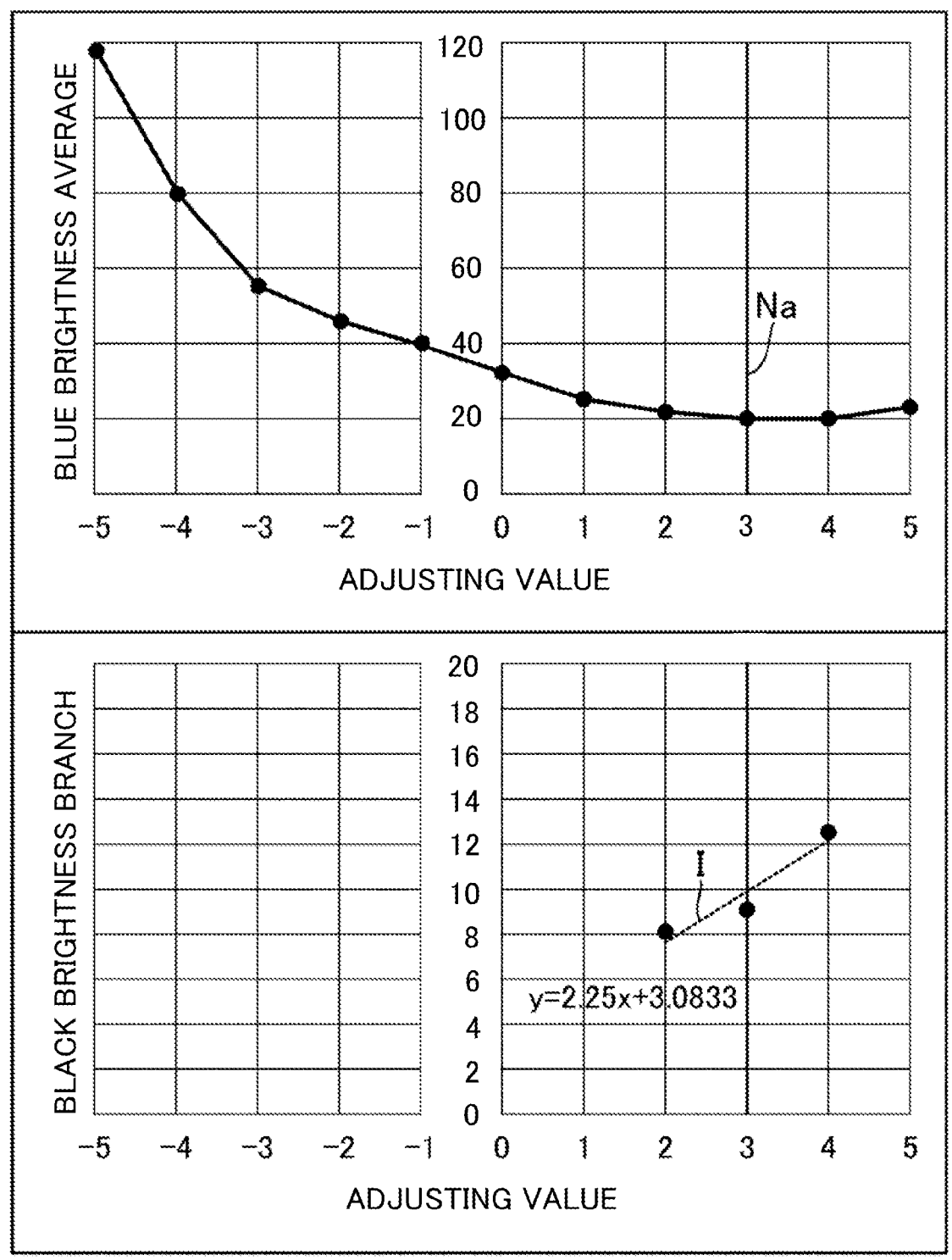

FIG. 13 includes graphs for illustrating a method of discriminating occurrence or non-occurrence of the "white void".

Figure 14:
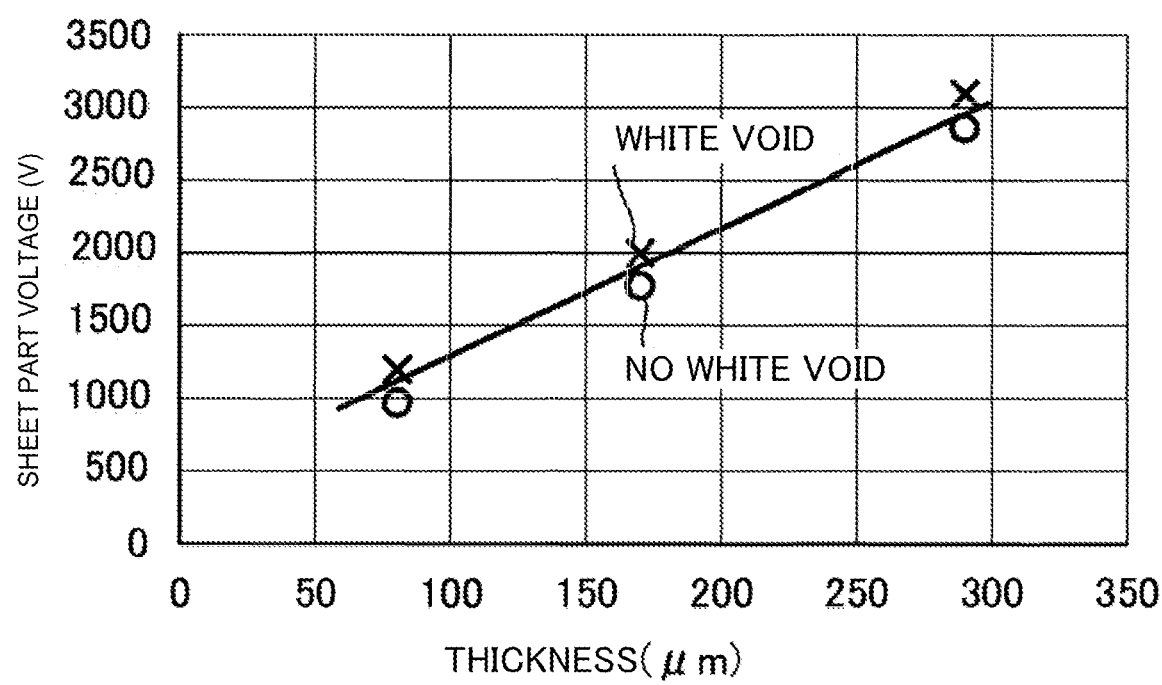

FIG. 14 is a graph for illustrating a relationship between a recording material part voltage and liability to occurrence of the "white volt".

FIG. 15 is a table showing table data of an upper limit of the recording material part voltage.

Figure 16:
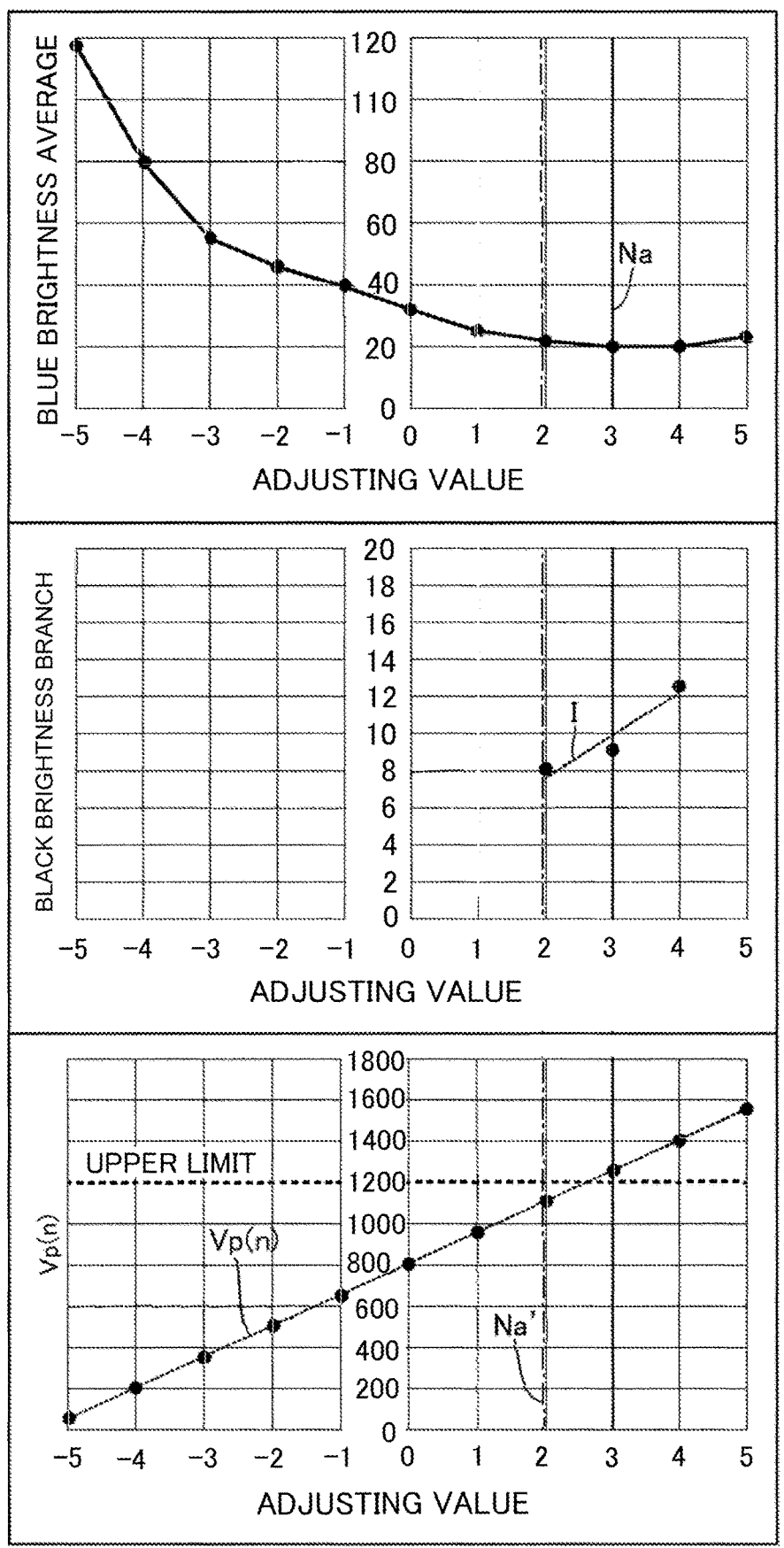

FIG. 16 includes graphs for illustrating a changing method of the adjusting value when the "white void" occurred.

Figure 17:
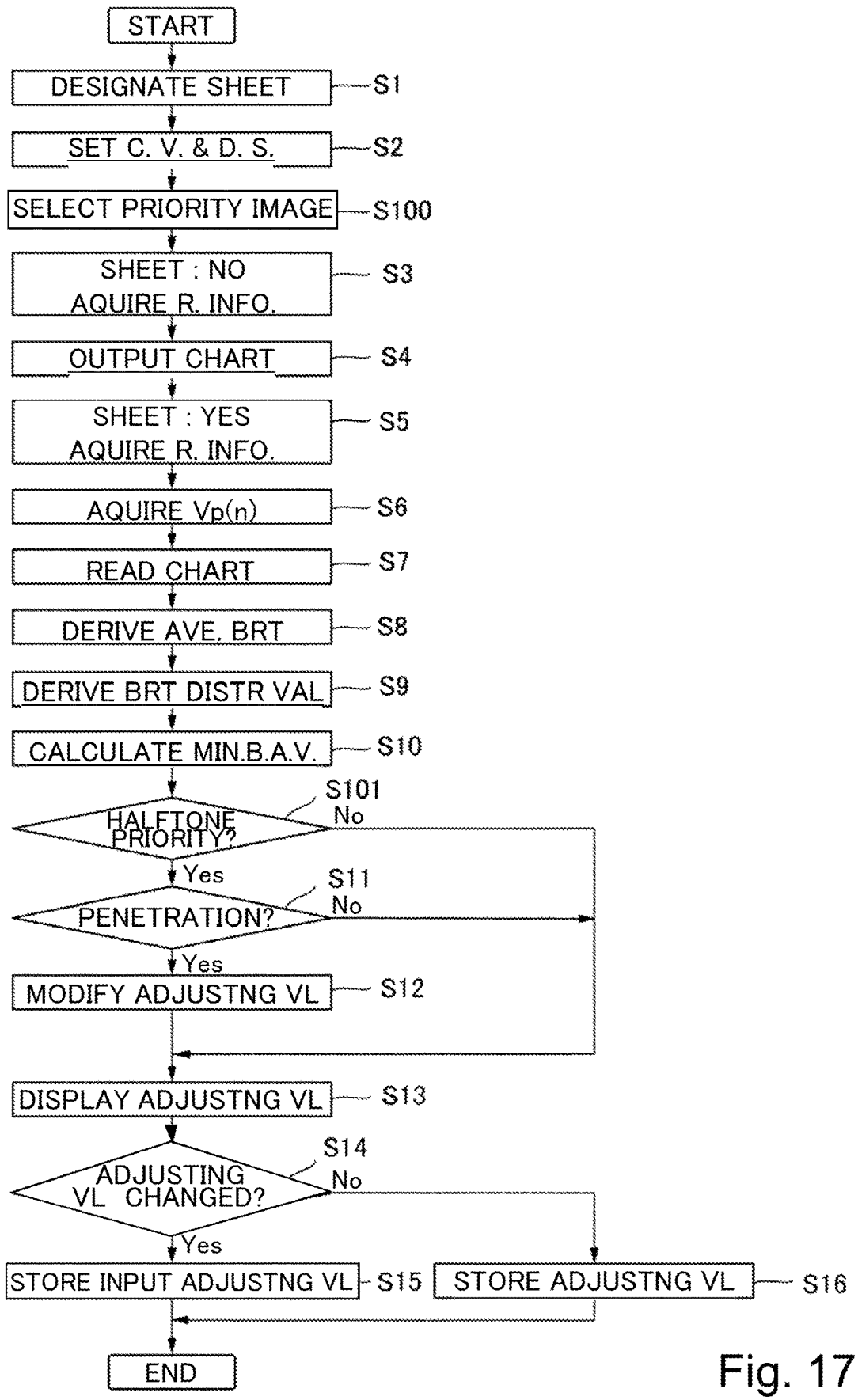

FIG. 17 is a flowchart showing an operation in an adjusting mode in a second embodiment.

Figure 18:
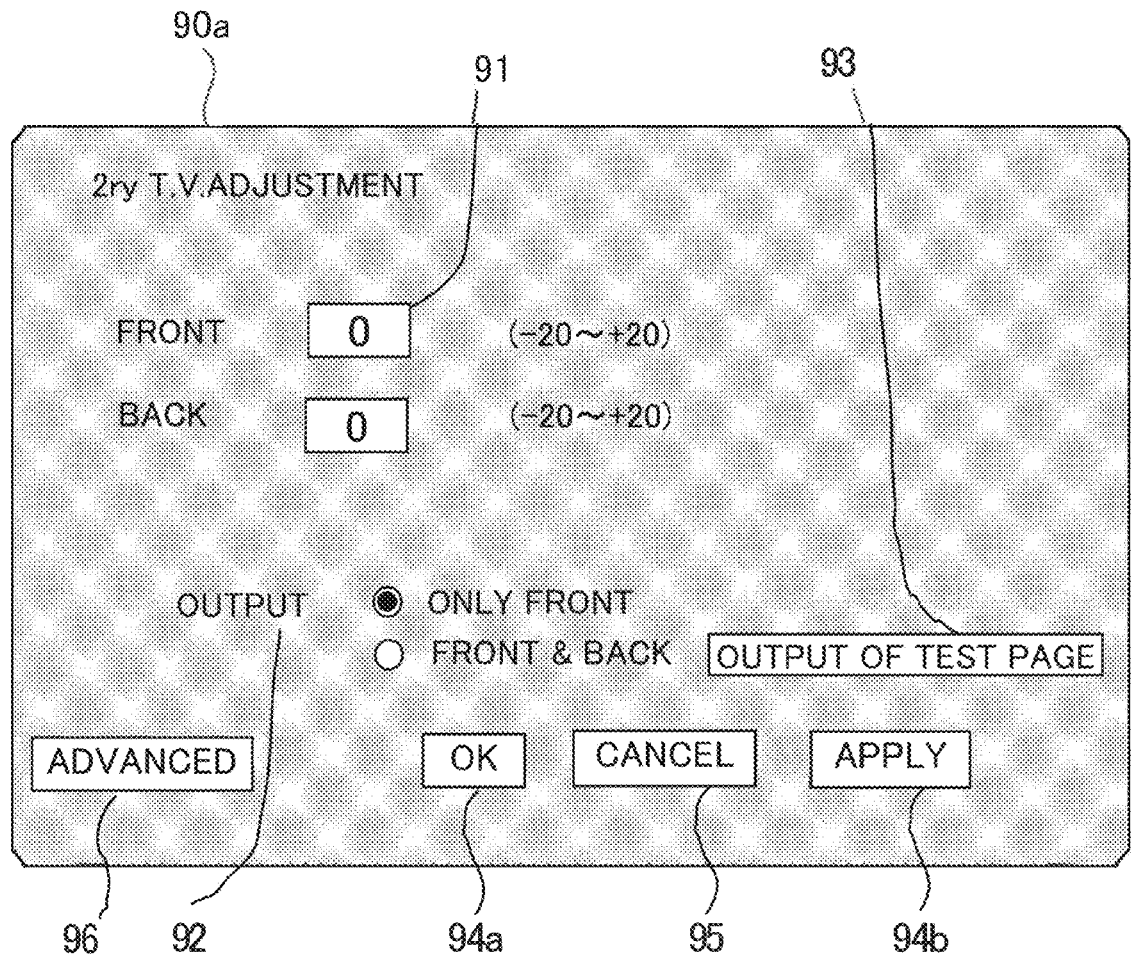

FIG. 18 is a schematic illustration showing a setting screen of a secondary transfer voltage in the second embodiment.

Figure 19:
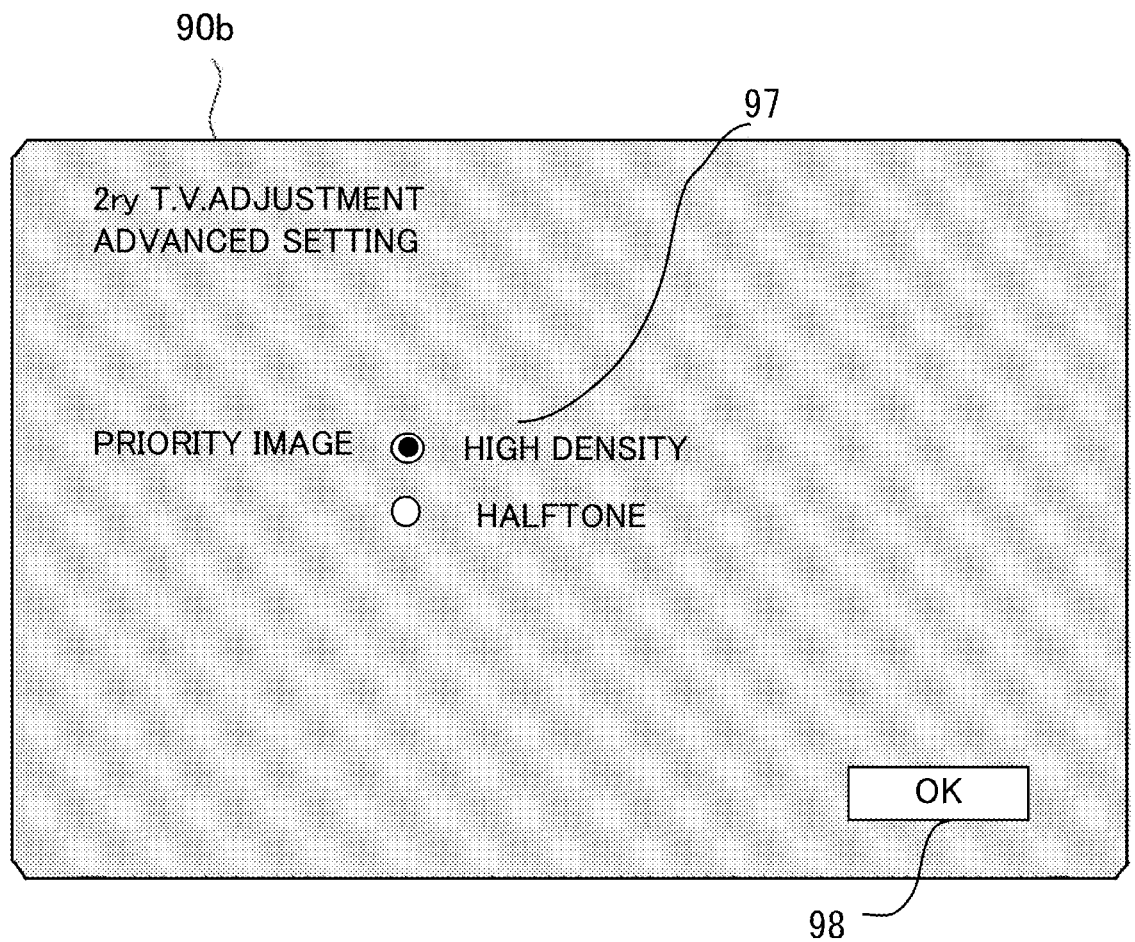

FIG. 19 is a schematic illustration showing a setting screen of a priority image.

DESCRIPTION OF EMBODIMENTS

First Embodiment

<Image Forming Apparatus>

In the following, an image forming apparatus according to a first embodiment will be described with reference to the drawings.

Figure 1:
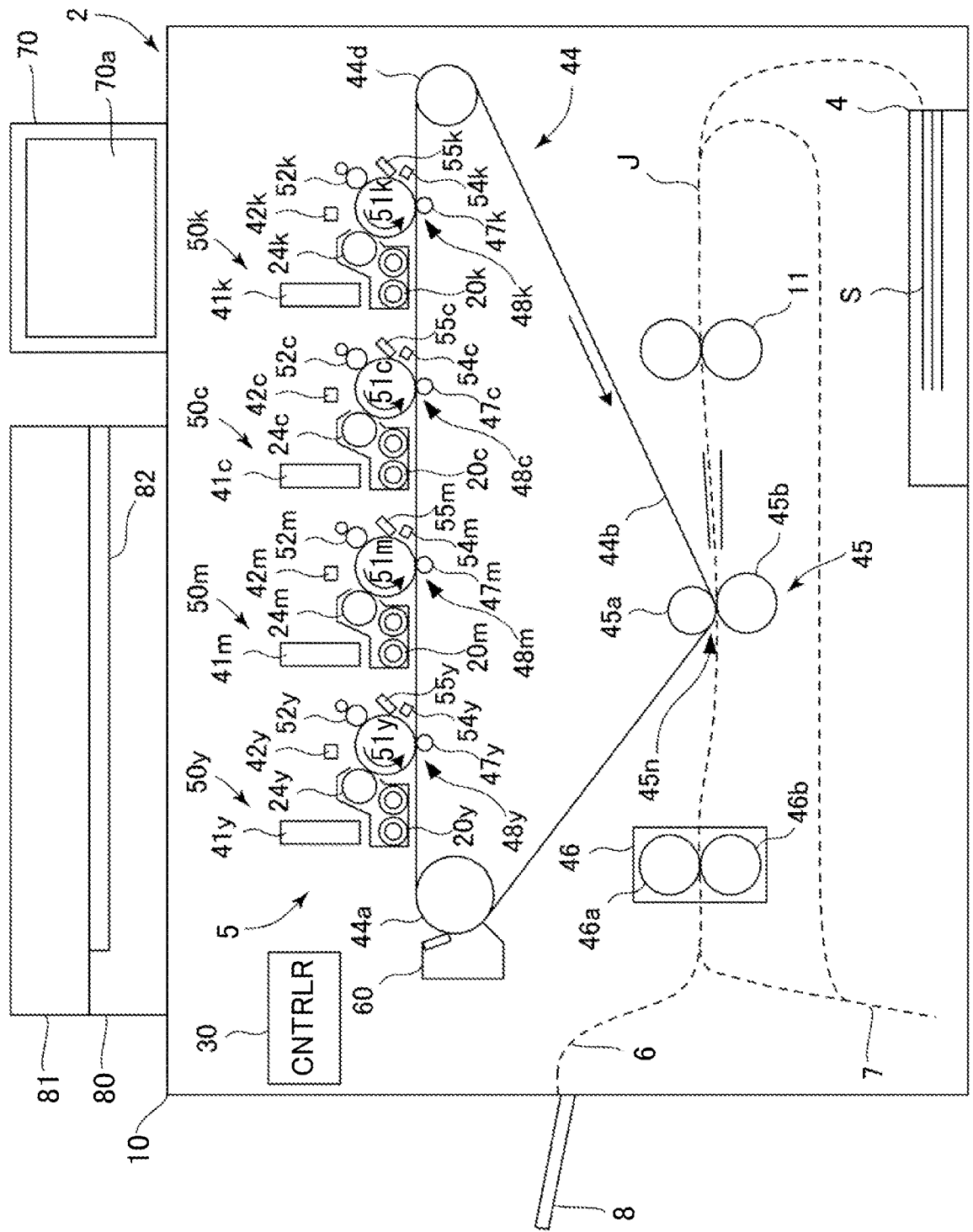
FIG. 1 is a schematic sectional view of an image forming apparatus of an embodiment.

FIG. 1 is a schematic cross-sectional view of an image forming apparatus 2 of this embodiment. The image forming apparatus 2 of this embodiment is a tandem type full-color printer capable of forming a full-color image by using an electrophotographic type process and employing an intermediary transfer type system. However, the image forming apparatus 2 of the present invention is not limited to a tandem type image forming apparatus, and may be an image forming apparatus of another type. In addition, the image forming apparatus 2 is not limited to an image forming apparatus capable of forming the full-color image, and may be an image forming apparatus capable of forming only a monochromatic (white/black or single color) image. Further, the image forming apparatus 2 may also be one of various-purpose image forming apparatuses such as printers, various printing machines, copying machines, facsimile machines and multi-function machines.

As shown in FIG. 1, the image forming apparatus 2 includes a feeding portion 4, an image forming portion 5, a controller 30, and an operating portion 70. In FIG. 1, the single feeding portion 4 is provided, but a plurality of feeding portions 4 may also be provided. Inside the apparatus, a temperature sensor 71 capable of detecting the temperature inside the apparatus and a humidity sensor 72 capable of detecting the humidity inside the apparatus are provided (see FIG. 2). The image forming apparatus 2 can form a four-color-based, full-color image on a recording material S, in accordance with image information (image signals) supplied from an image reading portion 80 as a reading means for reading an image on the sheet or from an external device 200 (see FIG. 2). As the external device 200, it is possible to cite a host device, such as a personal computer, or a digital camera or a smartphone. Here, the recording material S is a material on which a toner image is formed, and specific examples thereof include plain paper, synthetic resin sheets which are substitutes for plain paper, thick paper, and overhead projector sheets.

The image forming portion 5 can form the image on the recording material S fed from the feeding portion 4 and moved through an inside of a feeding path J, on the basis of the image information. The image forming portion 5 includes image forming units 50y, 50m, 50c, 50k, toner bottles 41y, 41m, 41c, 41k, exposure devices 42y, 42m, 42c, 42k, an intermediary transfer unit 44, a secondary transfer device 45, and a fixing portion 46. The image forming units 50y, 50m, 50c, and 50k form yellow (y), magenta (m), cyan (c), and black (k) images, respectively. Elements having the same or corresponding functions or structures provided for these four image forming units 50y, 50m, 50c, and 50k are collectively described in some instances by omitting suffixes y, m, c and k of reference numerals or symbols representing the elements for associated colors. Here, the image forming apparatus 2 can also form a single-color or multi-color image by using an image forming unit 50 for a desired single color or some of the four colors, such as a monochromatic black image.

The image forming unit 50 includes the following means. First, a photosensitive drum 51 which is a drum-type (cylindrical) photosensitive member (electrophotographic photosensitive member) is provided. In addition, a charging roller 52 which is a roller-type charging member is provided. In addition, a developing device 20 is provided. In addition, a pre-exposure device 54 is provided. In addition, a cleaning blade 55 is provided. The image forming unit 50 forms a toner image on the intermediary transfer belt 44b which will be described hereinafter. The image forming unit 50 is integrally assembled into a unit as a process cartridge and can be mounted to and dismounted from an apparatus main assembly 10.

The photosensitive drum 51 is movable (rotatable) while carrying an electrostatic image (electrostatic latent image) or a toner image. In this embodiment, the photosensitive drum 51 is a negatively chargeable organic photosensitive member (organic photoconductor: OPC) having an outer diameter of 30 mm. The photosensitive drum 51 has an aluminum cylinder as a base material and a surface layer formed on the surface of the base material. In this embodiment, the surface layer comprises three layers of an undercoat layer, a photocharge generation layer, and a charge transportation layer, which are applied and laminated on the substrate in the order named. When an image forming operation is started, the photosensitive drum 51 is driven to rotate in a direction indicated by an arrow (counterclockwise) in the figure at a predetermined process speed (circumferential speed) by a motor (not shown).

The surface of the rotating photosensitive drum 51 is uniformly charged by the charging roller 52. In this embodiment, the charging roller 52 is a rubber roller which contacts the surface of the photosensitive drum 51 and which is rotated by the rotation of the photosensitive drum 51. The charging roller 52 is connected with a charging bias (voltage) power source 73 (see FIG. 2). The charging bias (voltage) power source 73 applies a charging bias (charging voltage) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 includes a laser scanner in this embodiment. The exposure device 42 emits laser beam in accordance with the separated color image information outputted from the controller 30, and scans and exposes the surface (outer peripheral surface) of the photosensitive drum 51.

The electrostatic image formed on the photosensitive drum 51 is developed (visualized) by supplying the developer toner thereto by the developing device 20, so that a toner image is formed on the photosensitive drum 51. In this embodiment, the developing device 20 contains a two-component developer (also simply referred to as "developer") comprising non-magnetic toner particles (toner) and magnetic carrier particles (carrier). The toner is supplied from the toner bottle 41 to the developing device 20. The developing device 20 includes a developing sleeve 24. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to the main body (developing container) of the developing device 20. The developing sleeve 24 carries a developer and conveys it to a developing zone facing the photosensitive drum 51. A developing bias power source 74 (see FIG. 2) is connected to the developing sleeve 24. The developing bias power source 74 applies a developing bias (developing voltage) to the developing sleeve 24 during the developing process operation. In this embodiment, the normal charging polarity of the toner, which is the charging polarity of the toner during development, is negative.

An intermediary transfer unit 44 is arranged so as to face the four photosensitive drums 51y, 51m, 51c, 51k. The intermediary transfer unit 44 includes an intermediary transfer belt 44b, constituted by an endless belt, as a second image bearing member. The intermediary transfer belt 44b is wound around a plurality of rollers such as a driving roller 44a, a driven roller 44d, primary transfer rollers 47y, 47m, 47c, 47k, and an inner secondary transfer roller 45a. The intermediary transfer belt 44b is movable (rotatable) carrying the toner image. The driving roller 44a is rotationally driven by a motor (not shown) as driving means, and rotates (circulates) the intermediary transfer belt 44b. The driven roller 44d is a tension roller which controls the tension of the intermediary transfer belt 44b to be constant. The driven roller 44d is subjected to a force which pushes the intermediary transfer belt 44b toward the outer peripheral surface by the urging force of a spring (not shown), and by this force, a tension of about 2 to 5 kg is applied in a process advance direction of the intermediary transfer belt 44b. The inner secondary transfer roller 45a constitutes the secondary transfer device 45 as will be described hereinafter. The driving force is transmitted to the intermediary transfer belt 44b by the driving roller 44a, and the intermediary transfer belt 44b is rotationally driven in the arrow direction (clockwise) in the drawing at a predetermined peripheral speed corresponding to the peripheral speed of the photosensitive drum 51. In addition, the intermediary transfer unit 44 is provided with a belt cleaning device 60 as intermediary transfer member cleaning means.

The primary transfer rollers 47y, 47m, 47c, 47k are arranged to face the photosensitive drums 51y, 51m, 51c, 51k, respectively. The primary transfer roller 47 holds the intermediary transfer belt 44b between the photosensitive drum 51 and the primary transfer roller 47. By this, the intermediary transfer belt 44b contacts the photosensitive drum 51 to form a primary transfer portion (primary transfer nip portion) 48 with the photosensitive drum 51.

The toner image formed on the photosensitive drum 51 is primarily transferred onto the intermediary transfer belt 44b by the action of the primary transfer roller 47 in the primary transfer portion 48. That is, in this embodiment, by applying a positive primary transfer voltage to the primary transfer roller 47, a negative toner image on the photosensitive drum 51 is primarily transferred onto the intermediary transfer belt 44b. For example, when forming a full-color image, the yellow, magenta, cyan, and black toner images formed on the photosensitive drums 51y, 51m, 51c, and 51k are transferred so as to be sequentially superimposed on the intermediary transfer belt 44b. A primary transfer power source 75 (see FIG. 2) is connected to the primary transfer roller 47. The primary transfer power supply 75 applies a DC voltage having a polarity opposite to the normal charging polarity of the toner (positive polarity in this embodiment) as a primary transfer bias (primary transfer voltage) to the primary transfer roller 47 during the primary transfer process operation. The primary transfer power supply 75 is connected to a voltage detection sensor 75a which detects the output voltage and a current detection sensor 75b which detects the output current (see FIG. 2). In this embodiment, the primary transfer power sources 75y, 75m, 75c, and 75k are provided for the primary transfer rollers 47y, 47m, 47c, and 47k, respectively, and the primary transfer voltages applied to the primary transfer rollers 47y, 47m, 47c and 47k can be individually controlled.

The primary transfer roller 47 has an elastic layer of ion conductive foam rubber (NBR rubber) and a cored bar. The outer diameter of the primary transfer roller 47 is, for example, 15 to 20 mm. In addition, as the primary transfer roller 47, a roller having an electric resistance value of $1 \times 10^5$ to $1 \times 10^8 \Omega$ (N/N (23° C., 50% RH) condition, 2 kV applied) can be preferably used.

The intermediary transfer belt 44b is an endless belt having a two-layer structure including a base layer and a surface layer in the order named from the inner peripheral surface side. As the resin material constituting the base layer, a resin such as polyimide or polycarbonate, or a material containing an appropriate amount of carbon black as an antistatic agent in various rubbers can be suitably used. The thickness of the base layer is, for example, 0.05 to 0.15 [mm]. As a material constituting the surface layer, a resin such as a fluororesin can be suitably used. The surface layer has small adhesive force of the toner to the surface of the intermediary transfer belt 44b and makes it easier to transfer the toner onto the recording material S at a secondary transfer portion 45n. The thickness of the surface layer is, for example, 0.0002 to 0.020 [mm]. In this embodiment, for the surface layer, one kind of resin material such as polyurethane, polyester, epoxy resin, or two or more kinds of elastic materials such as elastic material rubber, elastomer, butyl rubber, for example, are used as a base material. And, as a material for reducing the surface energy and improving the lubricity of this base material, powder or particles such as fluororesin, for example, with one kind or two kinds or different particle diameters are dispersed, so that a surface layer is formed. In this embodiment, the intermediary transfer belt 44b has a volume resistivity of $5 \times 10^8$ to $1 \times 10^{14}$ [Ω·cm] (23° C., 50% RH) and a static friction coefficient of the intermediary transfer belt 44b is 0.15 to 0.6 (23° C., 50% RH, type 94i manufactured by HEIDON). In this embodiment, the two-layer structure was employed, but a single-layer structure of a material corresponding to the material of the base layer may also be employed.

On the outer peripheral surface side of the intermediary transfer belt 44b, an outer secondary transfer roller 45b which constitutes the secondary transfer device 45 in cooperation with the inner secondary transfer roller 45a is disposed. The outer secondary transfer roller 45b contacts the intermediary transfer belt 44b contacting the inner secondary transfer roller 45a and forms the secondary transfer portion (secondary transfer nip portion) 45n between the intermediary transfer belt 44b. The toner image formed on the intermediary transfer belt 44b is secondarily transferred onto the recording material S by the action of the secondary transfer device 45 in the secondary transfer portion 45n. In this embodiment, a positive secondary transfer voltage is applied to the outer secondary transfer roller 45b so that the negative toner image on the intermediary transfer belt 44b is secondarily transferred onto the recording material S which is nipped and fed between the intermediary transfer belt 44b and the outer secondary transfer roller 45b. The recording material S is fed from the feeding portion 4 in parallel with the above-described toner image forming operation, and the toner image on the intermediary transfer belt 44b is fed by a registration roller pair 11 provided in the feeding path J at the timing adjusted. The sheet is then fed to the secondary transfer portion N.

As described above, the secondary transfer device 45 is constituted by including an inner secondary transfer roller 45a and an outer secondary transfer roller 45b as a transfer member. The inner secondary transfer roller 45a is disposed opposite to the outer secondary transfer roller 45b with the intermediary transfer belt 44b interposed therebetween. To the outer secondary transfer roller 45b, a secondary transfer power supply 76 (see FIG. 2) is connected. During the secondary transfer process, the secondary transfer power source 76 applies a DC voltage having a polarity opposite to the normal charging polarity of the toner (positive in this embodiment) to the outer secondary transfer roller 45b as secondary transfer bias (secondary transfer voltage). The secondary transfer power source 76 is connected to a voltage detection sensor 76a for detecting the output voltage and a current detection sensor 76b for detecting the output current (see FIG. 2). The core of the inner secondary transfer roller 45a is connected to the ground potential. And, when the recording material S is supplied to the secondary transfer portion 45n, a secondary transfer voltage with constant-voltage-control having a polarity opposite to the normal charging polarity of the toner is applied to the outer secondary transfer roller 45b. In this embodiment, a secondary transfer voltage of 1 to 6.5 kV is applied, a current of about 50 to 100 μA, for example, is applied, and the toner image on the intermediary transfer belt 44b is secondarily transferred onto the recording material S. Here, in this embodiment, the inner secondary transfer roller 45a is connected to the ground potential, and a voltage is applied from the secondary transfer power source 76 to the outer secondary transfer roller 45b. On the other hand, a voltage from the secondary transfer power source 76 is applied to the inner secondary transfer roller 45a, and the outer secondary transfer roller 45b may also be connected to the ground potential. In such a case, a DC voltage having the same polarity as the normal charging polarity of the toner is applied to the inner secondary transfer roller 45a.

In this embodiment, the outer secondary transfer roller 45b has an elastic layer of ion conductive foam rubber (NBR rubber) and a core metal. The outer diameter of the outer secondary transfer roller 45b is, for example, 20 to 25 mm. In addition, as the outer secondary transfer roller 45b, a roller having an electric resistance value of $1 \times 10^5$ to $1 \times 10^8$ Ω (measured at N/N (23° C., 50% RH), 2 kV applied) can be preferably used.

The recording material S onto which the toner image has been transferred is fed to a fixing portion 46. The fixing portion 46 includes a fixing roller 46a and a pressure roller 46b. The fixing roller 46a includes therein a heater. The recording material S carrying the unfixed toner image is heated and pressed by being sandwiched and fed between the fixing roller 46a and the pressing roller 46b. By this, the toner image is fixed (melted and fixed) on the recording material S. Here, the temperature of the fixing roller 46a (fixing temperature) is detected by a fixing temperature sensor 77 (see FIG. 2).

In the case where image formation is carried out by one-side printing, the recording material S on which the toner image is fixed is fed through a discharge opening path 6 and is discharged through a discharge opening, and then is stacked on a discharge tray 8 provided outside the apparatus main assembly 10. On the other hand, in the case where the formation of the image on the recording material S is carried out by double (both)-side printing, the recording material S on which the toner image is fixed on a first side is turned upside down and is supplied again to the secondary transfer portion 45n. Then, the recording material S passes through a reverse feeding path 7 and is supplied to the secondary transfer portion 45n again, so that the toner image is transferred onto a second side and is fixed on the recording material S. Thereafter, the recording material S is fed along the discharge path 6 and is stacked on the discharge tray 8 provided outside the apparatus main assembly 10. As described above, the image forming apparatus 2 of this embodiment is capable of executing automatic double-side printing which forms images on both sides of a single recording material S.

The surface of the photosensitive drum 51 after the primary transfer is electrically discharged by the pre-exposure device 54. In addition, the toner remaining on the photosensitive drum 51 without being transferred onto the intermediary transfer belt 44b during the primary transfer process (primary untransferred residual toner) is removed from the surface of the photosensitive drum 51 by the cleaning blade 55 and is collected in a collection container (not shown). The cleaning blade 55 is a plate-like member which is in contact with the photosensitive drum 51 with a predetermined pressing force. The cleaning blade 55 is in contact with the surface of the photosensitive drum 51 in a counter direction in which the outer end portion of the free end portion faces the upstream side in the rotational direction of the photosensitive drum 51. In addition, toner remaining on the intermediary transfer belt 44b without being transferred onto the recording material S during the secondary transfer process (secondary untransferred residual toner) or adhering matter such as paper dust is removed and collected from the surface of the intermediary transfer belt 44b by the belt cleaning device 60.

At an upper portion of the apparatus main assembly 10, an automatic original feeding device 81 and an image reading portion 80 are provided. The automatic original feeding device 81 automatically feeds, toward the image reading portion 80, a sheet (for example, an adjusting chart described later) such as an original or the recording material S on which the image is formed. The image reading portion 80 as an acquiring portion reads the image on the sheet fed by the automatic original feeding device 81. The image reading portion 80 illuminates the sheet placed on a plating glass 82 with light from a light source (not shown) and is constituted so as to read the image on the sheet, in terms of a dot density determined in advance, by an image reading element (not shown). That is, the image reading portion 80 optically reads the image on the sheet and converts the read image into an electric signal.

<Controller>

As shown in FIG. 1, the image forming apparatus 1 of this embodiment includes the controller 30, and operations of respective portions are controlled by the controller 30. The controller 30 will be described using FIG. 2 while making reference to FIG. 1. The controller 30 is constituted by a computer, and includes, for example, a CPU (Central Processing Unit) 31, a ROM (Read Only Memory) 32, a RAM (Random Access Memory) 33, and an input/output circuit (I/F) 34 for inputting/outputting signals to and from the outside. The CPU 31 is a microprocessor which controls the entire image forming apparatus 2 and is a main part of the system controller. The CPU 31 is connected to the feeding portion 4, the image forming portion 5, and the operating portion 70 and the like via the input/output circuit (I/F) 34, and exchanges signals with these portions, and controls the operation of each of these portions. The ROM 32 stores an image formation control sequence (program) for forming an image on the recording material S. The controller 30 is connected to a charging bias power source 73, a developing bias power source 74, a primary transfer power source 75, and a secondary transfer power source 76, which are controlled by signals from the controller 30, respectively. In addition, the controller 30 is connected to a temperature sensor 71, a humidity sensor 72, a voltage detection sensor 75a and a current detection sensor 75b of the primary transfer power supply 75, a voltage detection sensor 76a and a current detection sensor 76b of the secondary transfer power supply 76, and a fixing temperature sensor 77.

The operating portion 70 as an input portion includes an unshown operation button, and a display portion 70a including a liquid crystal panel. In the case of this embodiment, the display portion 70a is constituted as a touch panel, and also has a function as the input portion. The operators such as a user or a service person can execute a job (a series of operations to form and output an image or images on one or more recording materials S in response to one start instruction) and can input various pieces of information by operating the operation portion 70. The controller 30 receives the signal from the operating portion 70 and operates various devices of the image forming apparatus 2. The image forming apparatus 2 can also execute the job on the basis of an image forming signal (image data, control command) supplied from the external device 200 such as the personal computer.

The controller 30 includes an image formation pre-preparation process portion 31a, an ATVC process portion 31b, an image formation process portion 31c, and an adjustment process portion 31d. In addition, the controller 30 includes a primary transfer voltage storage/operation portion 3l and a secondary transfer voltage storage/operation portion 31f. Here, each of these process portions and storage/operation portions may be provided as a portion or portions of the CPU 31 or the RAM 33. For example, the controller 30 (specifically the image formation process portion 31c) can execute a print job as described above. In addition, the controller 30 (specifically the ATVC process portion 31b) can execute ATVC (setting mode) for the primary transfer portion and the secondary transfer portion. The ATVC will be described hereinafter. In addition, the controller 30 (specifically the adjustment process portion 31d) can execute an operation in an adjustment mode for adjusting a set value of the secondary transfer voltage. The operation in the adjustment mode will be described hereinafter.

Here, the image forming apparatus 2 executes the job (image output operation, print job) which is series of operations to form and output an image or images on a single or a plurality of recording materials S started by one start instruction. The job includes an image forming step, a pre-rotation step, a sheet (paper) interval step in the case where the images are formed on the plurality of recording materials S, and a post-rotation step in general. The image forming step is performed in a period in which formation of an electrostatic image for the image actually formed and outputted on the recording material S, formation of the toner image, primary transfer of the toner image and secondary transfer of the toner image are carried out, in general, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is performed in a period in which a preparatory operation, before the image forming step, from an input of the start instruction until the image is started to be actually formed, is performed. The sheet interval step is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, and the post-rotation step, and further includes a period of a pre-multi-rotation step, which is a preparatory operation during turning-on of a main switch (power source) of the image forming apparatus 1 or during restoration from a sleep state.

<Control of Secondary Transfer Voltage>

Figure 3:
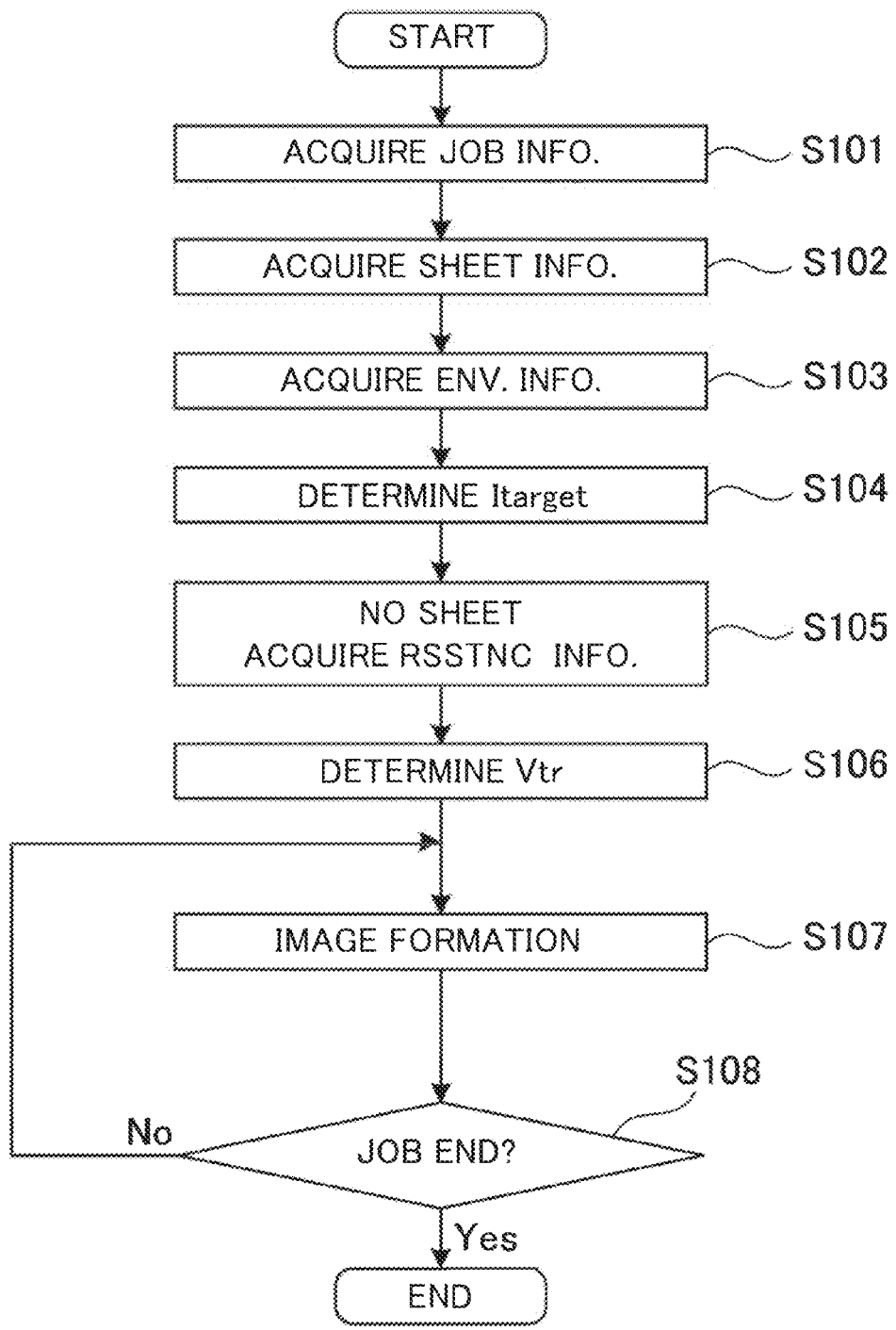
FIG. 3 is a flowchart showing control of a secondary transfer voltage.

Next, control of the secondary transfer voltage will be described. FIG. 3 is a flow chart showing an outline of a procedure relating to the control of the secondary transfer voltage in this embodiment. Generally, the control of the secondary transfer voltage includes constant-voltage control and constant-current control, and in this embodiment, the constant-voltage control is used.

First, the controller 30 (image formation pre-preparation process portion 31a) causes the image forming portion to start an operation of a job when it acquires information on the job from the operation portion 70 or the external device 200 (S101). In the information on this job, image information designated by the operator and information on the recording material S are included. The information on the recording material S includes information on a size of the recording material S and information on a kind (category of paper kind) of the recording material S such as "thin paper, plain paper, thick paper, . . . ". Incidentally, the kind of the recording material S includes features based on general characteristics such as plain paper, thick paper, thin paper, glossy paper, coated paper, and any distinguishable information on the recording material S, such as brand, product number, basis weight, thickness. The controller 30 writes this job information in the RAM 33 (S102).

Next, the controller 30 (image formation pre-preparation process portion 31a) acquires environment information detected by the temperature sensor 71 and the humidity sensor 72 (S103). In the ROM 32, information showing correction between the environment information and a target current Itarget for transferring the toner image from the intermediary transfer belt 44b onto the recording material S is stored. The controller 30 (secondary transfer voltage storage/operation portion 31f) acquires the target current Itarget corresponding to the environment from the information showing the correlation between the environment information and the target current Itarget, on the basis of the environment information read in S103. Then, the controller 30 writes this target current Itarget in the RAM 33 (or the secondary transfer voltage storage/operation portion 31f) (S104). Incidentally, why the target current Itarget is changed depending on the environment information is that the toner charge amount varies depending on the environment. The target current Itarget in this embodiment has been acquired for every environment in advance by a study on a secondary transfer current value at which a toner image (a secondary-color whole suppress image in this embodiment) with a maximum toner application amount can be transferred onto the recording material S by the image forming apparatus.

Figure 4:
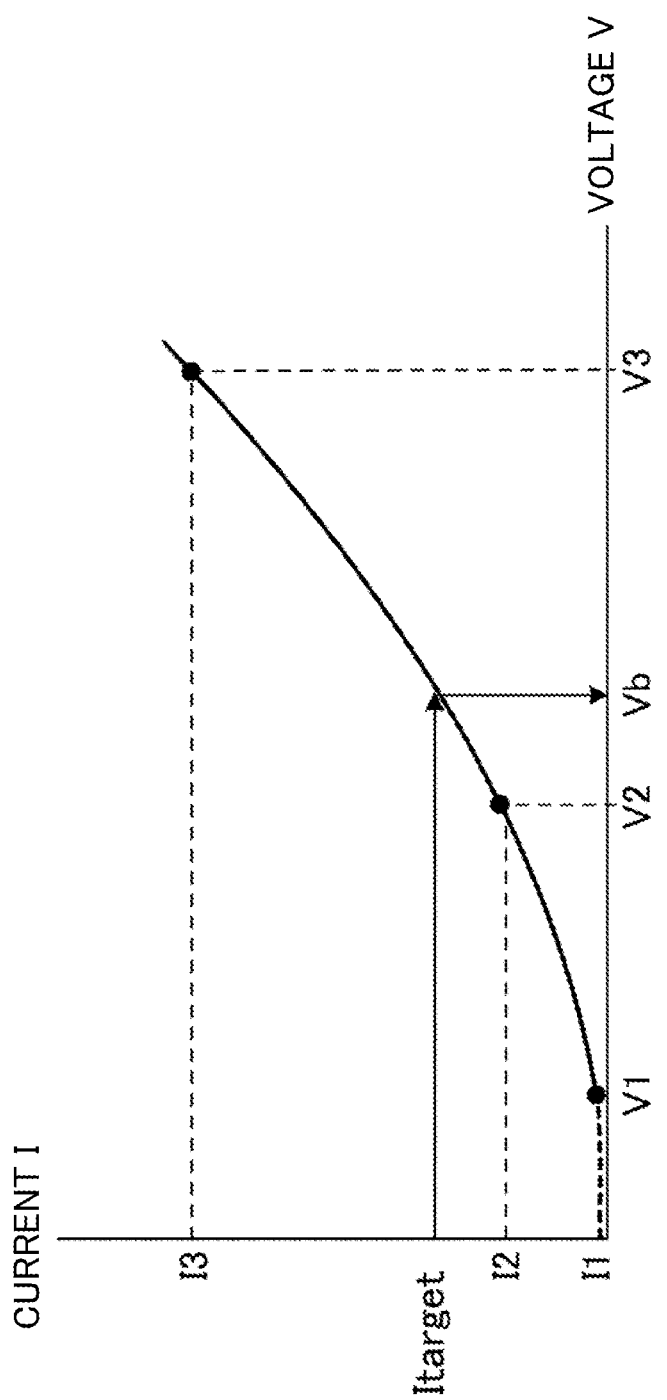
FIG. 4 is a graph showing a voltage-current characteristic acquired in the control of the secondary transfer voltage.

Next, the controller 30 (ATVC process portion 31b) acquires information on an electric resistance of the secondary transfer portion 45n by ATVC (Active Transfer Voltage Control) before the toner image on the intermediary transfer belt 44b and the recording material S onto which the toner image is transferred reach the secondary transfer portion 45n (S105). That is, in a state in which the outer secondary transfer roller 45b and the intermediary transfer belt 44b are contacted to each other, predetermined voltages of a plurality of levels are applied (supplied) from the secondary transfer power source 76 to the outer secondary transfer roller 45b. Then, current values when the predetermined voltages are applied are detected by the current detecting sensor 76b, so that a relationship between the voltage and the current (voltage-current characteristic) as shown in FIG. 4 is acquired. The controller 30 writes information on this relationship between the voltage and the current in the RAM 33. This relationship between the voltage and the current changes depending on the electric resistance of the secondary transfer portion 45n. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage. For that reason, in this embodiment, in order that the relationship between the voltage and the current can be represented by the polynomial expression, the number of predetermined voltages or currents supplied when the information on the electric resistance of the secondary transfer portion 45n is acquired is three or more (levels).

Then, the controller 30 (secondary transfer voltage storage/operation portion 31f) acquires a voltage value to be applied from the secondary transfer power source 76 to the outer secondary transfer roller 45b (S106). That is, on the basis of the target current Itarget written in the RAM 33 in S104 and the relationship between the voltage and the current acquired in S105, the controller 30 acquires a voltage value Vb necessary to cause the target current Itarget to flow in a state in which the recording material S is absent in the secondary transfer portion 45n. This voltage value Vb corresponds to a secondary transfer portion part voltage (transfer voltage corresponding to the electric resistance of the secondary transfer portion 45n). Further, in the ROM 32, information for acquiring a recording material part voltage (transfer voltage corresponding to the electric resistance of the recording material S) Vp as shown in FIG. 5 is stored. This information is set as table data between ambient water content and the recording material part voltage Vp for each of sections (corresponding to paper kind categories) of basis weights of recording materials S. The table data for acquiring the recording material part voltage Vp as shown in FIG. 5 is acquired in advance by an experiment or the like. Incidentally, the controller 30 (image formation pre-preparation process portion 31a) is capable of acquiring water content in an external environment (which may include the inside of the apparatus main assembly) on the basis of environment information (temperature, humidity) detected by the temperature sensor 71 and the humidity sensor 72.

On the basis of the information on the job acquired in S101 and the environment information acquired in S103, the controller 30 acquires the recording material part voltage Vp from the above-described table data. Further, in the case where the adjusting value is set by the operation in the adjustment mode, described later, for setting the set voltage of the secondary transfer voltage, an adjusting value ΔV is determined depending on the adjusting value. As described later, this adjusting value ΔV is stored in the RAM 33 (or the secondary transfer voltage storage/operation portion 31f) in the case where the adjusting value is set by the operation in the adjustment mode. The controller 30 acquires Vb+Vp+ΔV which is the sum of the above-described voltage values Vb, Vp and ΔV, as a secondary transfer voltage Vtr applied from the secondary transfer power source 76 to the outer secondary transfer roller 45b when the recording material S passes through the secondary transfer portion N2. Then, the controller 30 writes this Vtr (=Vb+Vp+ΔV) in the RAM 33 (or the secondary transfer voltage storage/operation portion 31f).

Here, the recording material part voltage Vp also changes depending on a surface property of the recording material S other than the information (thickness, basis weight or the like) relating to the resistance of the recording material S in some instances. For that reason, the table data may also be set so that the recording material part voltage Vp changes also depending on the information relating to the surface property of the recording material S. Further, in this embodiment, the information relating to the resistance of the recording material S (and in addition, the information relating to the surface property of the recording material S) are included in the job information acquired in S101. However, a measuring means for detecting the thickness of the recording material S and the surface property of the recording material S is provided in the image forming apparatus 2, and the recording material part voltage Vp may also be acquired on the basis of information acquired by this measuring means.

Next, the controller 30 (the image formation process portion 31c) causes the image forming portion to form the image and to send the recording material S to the secondary transfer portion 45n and causes the secondary transfer device to perform the secondary transfer by applying the secondary transfer voltage Vtr determined as described above (S107). Thereafter, the controller 30 (the image formation process portion 31c) repeats the processing of S107 until all the images in the job are transferred and completely outputted on the recording material S (S108).

Incidentally, also as regards the primary transfer portion 48, the ATVC similar to the above-described ATVC is carried out in a period from a start of the job until the toner image is fed to the primary transfer portion 48, but detailed description thereof will be omitted in this embodiment.

<Outline of Adjustment Mode>

Next, an operation in a simple adjustment mode (hereinafter simply referred to as an "adjustment mode) for setting the set voltage of the secondary transfer voltage will be described. Depending on the type and condition of the recording material S used in image formation, the kind water (moisture) content and electrical resistance value of the recording material S may differ greatly from the standard recording material S. In this case, optimal transfer may not be performed with the set voltage of the secondary transfer voltage using the default recording material part voltage Vp set in advance as described above.

First, the secondary transfer voltage needs to be a voltage necessary for transferring the toner from the intermediary transfer belt 44b to the recording material S. In addition, the secondary transfer voltage must be suppressed to a voltage level with which the abnormal discharge does not occur. However, depending on the type and state of the recording material S actually used for image formation, the electrical resistance may be higher than the value assumed as a standard value. In such a case, the voltage required to transfer the toner from the intermediary transfer belt 44b to the recording material S may be insufficient with the set secondary transfer voltage using the preset default recording material part voltage Vp. Therefore, in this case, it is desired to increase the set voltage of the secondary transfer voltage by increasing the recording material part voltage Vp. On the contrary, depending on the type and condition of the recording material S actually used for image formation, the water (moisture) content of the recording material S may have increased, with the result that the electrical resistance is lower than the value assumed as a standard value, and therefore, the electrical discharge may be likely to occur. In this case, with the setting voltage of the secondary transfer voltage using the preset default recording material part voltage Vp, image defects may occur due to the abnormal discharge. Therefore, in this case, it is desirable to lower the set voltage of the secondary transfer voltage by reducing the recording material part voltage Vp.

Therefore, it is desired that the operator such as a user or a service person adjusts (changes) the recording material part voltage Vp depending on the recording material S actually used for image formation, for example, to optimize the setting voltage of the secondary transfer voltage during the execution of the job (during the image formation). In other words, it is only required that an optimum "recording material part voltage Vp+Vb (adjusting amount)" depending on the recording material S actually used for image formation is selected. This adjustment may be performed by the following method. For example, the operator outputs the images while switching the secondary transfer voltage for each recording material S, and confirms the presence or absence of an image defect occurring in the output image to obtain an optimal secondary transfer voltage, on the basis of which setting voltage (specifically, (recording material part voltage) Vp+(adjusting amount) ΔV) of the optimum secondary transfer voltage is determined. However, in this method, since the outputting operation of the image and the adjustment of the setting voltage of the secondary transfer voltage are repeated, the recording material S which is wasted increases, and it takes time in some instances.

In the case of this embodiment, the image forming apparatus 2 is operable in the adjustment mode in which the secondary transfer voltage set during the image formation is adjusted. In this operation in the adjustment mode, an adjusting chart (test chart) on which a plurality of representative color patches (test toner images) are formed every voltage (for each test voltage) is outputted on the recording material S which is actually used for image formation, while the secondary transfer voltage is switched. And, the secondary transfer voltage (specifically, (recording material part voltage) Vp+(adjusting amount) ΔV) set during the image formation is adjusted on the basis of an acquired result (information on image density) of the reading of patches on the outputted adjusting chart (recording material) by the image reading portion 80. In the case of this embodiment, on the basis of brightness data (density information) of a solid patch (solid image patch) on the adjusting chart, information on the adjusting amount ΔV for setting a secondary transfer voltage for optimizing a solid image density is capable of being presented. By this, necessity that the operator confirms the presence or absence of the image defect by eye observation is reduced, so that it becomes possible to adjust the set voltage to a set voltage of a more appropriate secondary transfer voltage while alleviating an operation load of the operator.

However, at the setting voltage of the secondary transfer voltage adjusted on the basis of the result of reading of the patch as described above, the secondary transfer voltage (absolute value) is excessively high and the "white void" occurs in some cases. This is because it is difficult to discriminate occurrence or non-occurrence of the "white void" by using an average image density of the patch acquired from the brightness data of the patch. However, it has been known that the recording material part voltage at which the "white void" is liable to occur has a correlation to the thickness of the recording material S. Further, the present inventors have found that the occurrence or non-occurrence of the white void can be discriminated by a variation (specifically, a brightness dispersion value described later) in divided regions of the patch (test toner image) through an experiment.

Therefore, in this embodiment, as described later, the occurrence or non-occurrence of the white void is discriminated on the basis of the density of the patch formed on the adjusting chart. Then, an "adjusting amount ΔV" necessary to adjust the set voltage (recording material part voltage Vp+(adjusting amount ΔV) of the secondary transfer voltage can be made different between the case where the white void occurs and the case where the white void does not occur.

<Adjusting Chart>

In this embodiment, in the operation in the adjustment mode, brightness data of the patch is acquired by reading an outputted adjusting chart by the image reading portion 80, and a recommended adjusting amount of the set voltage of the secondary transfer voltage is presented. Further, in this embodiment, the operator visually recognizes the outputted adjusting chart in the operation in the adjustment mode, so that it is also possible to change the adjusting amount presented as described above.

When confirmation of the outputted chart through eye observation by the operator is also taken into consideration, the larger the patch size of the adjusting chart that is outputted in the operation in the adjustment mode, the more advantageous it becomes since then it is easier to check for image defects. However, if the patch is large, the number of patches which can be formed on one recording material S is reduced. The patch shape can be square and so on. The color of the patch can be determined by the image defect to be checked and by the easiness of checking. For example, when the secondary transfer voltage is increased from a low value, the lower limit of the secondary transfer voltage can be determined from the voltage value at which the secondary-color patches such as red, green, and blue can be properly transferred. In addition, in the case where the operator confirms the outputted chart by eye observation, when the secondary transfer voltage is further increased, the upper limit value of the secondary transfer voltage can be determined from the voltage value at which image failure (defect) occurs due to the high secondary transfer voltage in the halftone patch.

Figure 6:
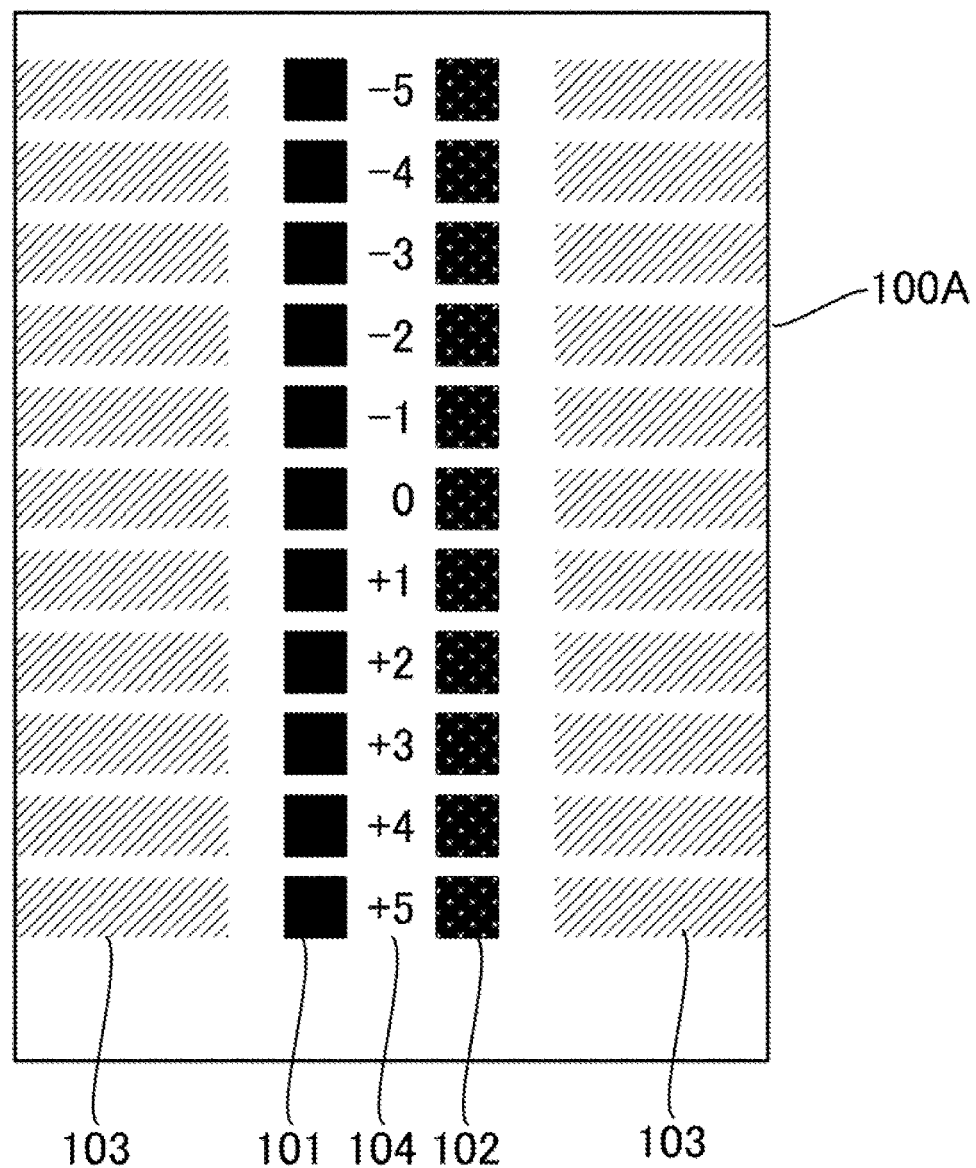
FIG. 6 is a schematic illustration of large chart data.

The adjusting chart usable with the operation in the adjustment mode in this embodiment will be described. In the operation in the adjustment mode in this embodiment, two types of image data (100A and 100B) shown in FIG. 6 and parts (a) and (b) of FIG. 7 are used for output of an adjusting chart 100. FIG. 6 shows image data of the adjusting chart (hereinafter also referred to as "large chart data") 100A outputted to the recording material S having a length in the process advance direction of 420 to 487 mm. Parts (a) and (b) of FIG. 7 show image data for a first side and a second side of the adjusting chart (hereinafter also referred to as "small chart data") 100B outputted to the recording material S having a length in the process advance direction of 210 to 419 mm. In this embodiment, as the adjusting chart image data, only two types of image data shown in FIG. 6 and parts (a) and (b) of FIG. 7 are set. And, in the operation in the adjustment mode, the adjusting chart corresponding to the image data cut out from any one of the two types of image data shown in FIG. 6 and parts (a) and (b) of FIG. 7 depending on the size of the recording material S to be used is outputted on the recording material S. At this time, in this embodiment, image data having a size obtained by subtracting the margins at the end of the recording material S from the image data shown in FIG. 6 and parts (a) and (b) of FIG. 7 is cut out.

Here, in this embodiment, the maximum size (maximum sheet passing size) of the recording material S on which the image forming apparatus 2 can form an image is 13 inches×19.2 inches (short edge feeding). In addition, herein, the direction in which the recording material S is fed in the secondary transfer portion 45n is referred to as the "process advance direction" and the direction substantially perpendicular to the process advance direction is referred to as a "longitudinal direction".

The large chart data 100A shown in FIG. 6 will be further described. The large chart data 100A corresponds to the maximum sheet passing size of the image forming apparatus 2 of this embodiment, and the image size is approx. (longitudinal direction) 13 inches (≈330 mm) at the short side)×(process advance direction) 19.2 inches (≈487 mm) at the long side. When the size of the recording material S is 13 inches×19.2 inches (short edge feeding) or less and more than A3 size (short edge feeding), the adjusting chart corresponding to image data cut out from this large chart data 100A according to the size of the recording material S is outputted. At this time, in this embodiment, the image data is cut out from the large chart data 100A in accordance with the size of the recording material S based on the leading end center with respect to the process advance direction. For example, in the case where of the adjusting chart 110 is outputted to the recording material S of A3 size (short edge feeding) (short side 297 mm×long side 420 mm), the image data having a size of 292 mm (short side)×415 mm (long side) is cut out from the large chart data 100A. And, the image corresponding to the cut-out image data is outputted on an A3 size recording material S with a margin of 2.5 mm at each end portion with the leading end center being the reference position with respect to the process advance direction.

The large chart data 100A includes one blue solid patch 101, one black solid patch 102, and two halftone patches 103 (gray (black halftone) in this embodiment) arranged in the longitudinal direction. And, eleven sets of patch sets (101 to 103) in the longitudinal direction are arranged in the process advance direction. The blue solid patch 101 and the black solid patch 102 are each 25.7 mm×25.7 mm square (one side is substantially parallel to the longitudinal direction). In addition, each of the halftone patches 103 at both ends has a width of 25.7 mm in the process advance direction, and extends to the end of the large chart data 100A in the longitudinal direction. In addition, the interval between the patch sets 101 to 103 in the process advance direction is 9.5 mm. The secondary transfer voltage is switched at the timing when the portion on the adjusting chart corresponding to this interval passes through the secondary transfer portion 45n. The 11 patch sets (101-103) in the process advance direction of the large chart data 100A are within the range of 387 mm in the process advance direction such that when the size of the recording material S is A3, they are within the length 415 mm of the recording material S in the process advance direction. In addition, in this example, the large chart data 100A includes identification information 104 for identifying the setting of the secondary transfer voltage applied to each patch set in conjunction with each of 11 patch sets (101 to 103) in the process advance direction. In this embodiment, this identification information 104 corresponds to an adjusted (adjustment) value described later. In this embodiment, eleven pieces of identification information 104 (−5 to 0 to +5 in this embodiment) corresponding to eleven steps of secondary transfer voltage settings are provided.

When the eye observation by the operator is also taken into consideration, the size of the patch is required to be large enough to permit the operator to easily determine whether there is an image defect or not. For the transferability of blue solid patch 101 and black solid patch 102, if the size of the patch is small, it can be difficult to discriminate the defect, and therefore, the size of the patch is preferably 10 mm square or more, and, more preferably, is 25 mm square or more. The image defects due to abnormal discharge which occur when the secondary transfer voltage is increased in the halftone patch 103 are often in the form of white spots. This image defect tends to be easy to discriminate even in a small size image, compared to the transferability of the solid image. However, it is easier to observe if the image is not too small, and therefore, in this embodiment, the width of the halftone patch 103 in the process advance direction is the same as the width of the blue solid patch 101 and the black solid patch 102 in the process advance direction. In addition, the interval between the patch sets (101 to 103) in the process advance direction may be set so that the secondary transfer voltage can be switched.

Here, it is preferable to prevent patches from being formed in the neighborhood of the leading and trailing ends of the recording material S in the process advance direction (for example, in the range of about 20 to 30 mm inward from the edge). This is because there may be an image defect that occurs only at the leading end or the trailing end, and is because, it may be difficult to determine whether or not an image defect has occurred due to the secondary transfer voltage. Incidentally, the solid image is an image with a maximum density level. In addition, in this embodiment, the half-tone image corresponds to an image with a toner application amount of 10% to 80% when the toner application amount of the solid image is 100%.

Using the large chart data 100A described above, as the size of the recording material S becomes smaller than 13 inches (A3 size or more), the length, in the longitudinal direction, of the halftone patch 103 at both ends in the longitudinal direction becomes smaller. In addition, using the large chart data 100A as described above, as the size of the recording material S becomes smaller than 13 inches (however, A3 size or more), the margin at the trailing end in the process advance direction becomes smaller.

The small chart data 100B shown in parts (a) and (b) of FIG. 7 will be further described. The small chart data 100B corresponds to a size smaller than the A3 size, and the image size is approximately long side (longitudinal direction) 13 inches (≈330 mm)×short side (process advance direction) 210 mm. If the size of the recording material S is A5 (short side 148 mm×long side 210 mm) (longitudinal feed) or more and smaller than A3 size (longitudinal feed), an adjusting chart corresponding to the image data cut out of the small chart data 100B depending on the size of the recording material S is outputted. In this embodiment, the image data is cut out of the small chart data 100B in accordance with the size of the recording material S on the basis of the leading end center with respect to the process advance direction. When the small chart data 100B is used, two adjusting charts are outputted in order to increase the number of patches.

The small chart data 100B has the same patches as those of the large chart data 100A. And, in the small chart data, five sets of patch sets (101 to 103) in the longitudinal direction are arranged in the process advance direction. The five patch sets (101 to 103) in the process advance direction of the small chart data 100B are arranged in a range of 167 mm in length in the process advance direction. In addition, in this example, the small chart data 100B is provided with identification information 104 for identifying the setting of the secondary transfer voltage applied to each set of patch sets, in association with the respective ones of the five patch sets (101 to 103) in the process advance direction. And, on the first sheet, based on the small chart data 100B shown in part (a) of FIG. 7, five pieces of identification information 104 (−4 to 0 in this embodiment) corresponding to the setting of the lower secondary transfer voltage in five steps are arranged. In addition, on the second sheet, based on the small chart data 100B shown in part (b) of FIG. 7, five (+1 to +5 in this embodiment) identification information 104 corresponding to higher five-level secondary transfer voltage settings are arranged.

Using the above small chart data 100B, as the size of the recording material S becomes smaller (however, smaller than the A3 size and larger than the A5 size), the length, in the longitudinal direction, of the halftone patch 103 at both ends in the longitudinal direction becomes smaller. In addition, using the small chart data 100B as described above, as the size of the recording material S becomes smaller (however, smaller than the A3 size and larger than the A5 size), the margin at the trailing end in the process advance direction becomes smaller.

Here, in this embodiment, not only a standard size but also an arbitrary size (A5 size or more, 13 inches×19.2 inches or less) recording material S is usable by an operator inputting and designating on the operating portion 70 or the external device 200.

<Adjustment Mode>

Next, the operation in the adjusting mode in this embodiment will be described. FIG. 8 is a flowchart showing the operation in the adjustment mode in this embodiment. In addition, FIG. 9 is a schematic illustration of a setting screen displayed on the operating portion 70. The controller 30 executes the operation in the adjusting mode in the case where the operator provides an instruction to execute the adjustment mode operation via the operating portion 70 of the image forming apparatus 2.

During the operation in the adjusting mode, the controller 30 (adjustment process portion 31*d*) causes the operating portion 70 to display a setting screen (not shown) for the kind and size of the recording material S and prompts the operator to input the kind and the size of the recording material S on which the operator desires to form the image (S1). The controller 30 (adjustment process portion 31*d*) then acquires information on the kind and size of the recording material S designated by the operator through the operating portion 70.

Next, the controller 30 causes the operator to set the central voltage value of the secondary transfer voltage applied at the time of adjusting chart output, and whether to output the adjusting chart to one side or both sides of the recording material S (S2). In this embodiment, in order to be able to adjust the secondary transfer voltage during secondary transfer to the front side (first side) and back side (second side) in double-side printing, the adjusting chart can be outputted on both sides of the recording material S also in the operation in the adjustment mode.

In order to make the above-described setting, the controller 30 causes the operating portion 70 to display an adjustment mode setting screen 90 as shown in FIG. 9. The setting screen 90 has a voltage setting portion 91 for setting the center voltage value of the secondary transfer voltage for the front and back sides of the recording material S. In addition, the setting screen 90 has an output side selection portion 92 for selecting whether to output the adjusting chart to one side or both sides of the recording material S. Furthermore, the setting screen 90 includes an output instruction portion (test page output button) 93 for instructing adjusting chart output, a confirmation portion 94 (OK button 94*a* or the apply button 94*b*) for confirming the setting, and a cancel button 95 for canceling the setting change.

When adjusting value "0" is selected in voltage setting portion 91, a preset voltage (more specifically, the recording material part voltage Vp) set in advance for the currently selected recording material S is selected. And, the case that adjusting value "0" is selected will be considered in which 11 sets of patches from −5 to 0 to +5 when large chart data is used, and 10 sets of patches from −4 to 0 to +5 when small chart data is used, are switched and applied as the secondary transfer voltages. In this embodiment, description will be made on assumption that the large chart data is used and the adjusting chart including the 11 sets of patches is outputted. In this embodiment, the difference in secondary transfer voltage for one level is 150V. The controller 30 acquires information relating to the setting such as the center voltage value set by way of the setting screen 90 in the operation portion 70.

Next, when the output instruction portion 93 on the setting screen 90 is selected by the operator, the controller 30 acquires information on the electric resistance of the secondary transfer portion N when the recording material S is absent in the secondary transfer portion N (S3). In this embodiment, the controller 30 acquires a polynomial expression (quadratic expression in this embodiment) of two or more terms (terms of the second degree or more) with respect to a voltage-current relationship depending on the electric resistance of the secondary transfer portion N by an operation similar to the operation in the above-described ATVC. The controller 30 writes information on this voltage-current relationship in the RAM 33.

Then, the controller 30 causes the image forming apparatus to output the chart (S4). At this time, the controller 30 cuts out the chart data as described above on the basis of the size information of the recording material S acquired in S1 and causes the image forming apparatus to output the adjusting chart on which the 11 sets of patches are transferred while changing the secondary transfer voltage every 150 V. For example, it is assumed that the recording material part voltage in the present environment is 900 V, and the secondary transfer portion part voltage Vb acquired from the result of the ATVC is 1000 V. In this case, by applying from 1150 V to 2650 V, the adjusting chart, on which the 11 sets of patches are transferred while changing the secondary transfer voltage in increments of 150 V, is formed. At this time, the controller 30 causes the current detection sensor 76b to detect a value of the current flowing during application of voltages of respective voltage levels, and acquires information on the electric resistances of the secondary transfer portion 45n and the recording material S when the recording material S is present in the secondary transfer portion 45n (S5). In this embodiment, the controller 30 acquires, from a detection result of currents for voltages of 11 levels, the polynomial expression (quadratic expression in this embodiment) of two or more terms with respect to the voltage-current relationship depending on the electric resistances of the secondary transfer portion N and the recording material S. The controller 30 writes the information on the voltage-current relationship in the RAM 33. Incidentally, the current when the recording material S is present in the secondary transfer portion N may typically be detected during transfer of the patch, but may also be detected at a portion of the recording material S where there is no toner before and after the patch for each voltage level.

Then, the controller 30 acquires the recording material part voltage Vp(n) at each of the voltage levels from the relationship (quadratic expression) between the voltage and the current, when the recording material S is present in the secondary transfer portion 45n, acquired in S5 and from the relationship (quadratic expression) between the voltage and the current, when the recording material S is present in the secondary transfer portion 45n, acquired in S3 (S6). Here, "n" represents each of the voltage levels, and in this embodiment, "n" ranges from "1 to 11" corresponding to the 11 levels (11 sets of patches). Further, the voltage value of each voltage level is represented by Vtr(n). Further, the voltage value calculated by applying each level to the relationship (quadratic expression) between the voltage and the current, when the recording material S is absent in the secondary transfer portion N, acquired in S3 is represented by Vb(n). At this time, recording material part voltage Vp(n) at each voltage level is represented by "Vp(n)=Vtr(n)−Vb(n)".

Then, the outputted adjusting chart is supplied by the operator to the image reading portion 80 by using the automatic original feeding device 81, for example, so that the adjusting chart is read by the image reading portion 80 (S7). At this time, the image reading portion 80 is controlled by the controller 30, and in this embodiment, RGB brightness data (8 bit) of each of the solid blue and black patches on the adjusting chart are acquired. Incidentally, when the adjusting chart is outputted, the controller 30 is capable of causing the operating portion 70 to display a message prompting the operator to supply the outputted adjusting chart to the image reading portion 80.

Next, the controller 30 acquires an average of values of the brightness of each of the solid blue and black patches in accordance with formula (1) appearing hereinafter by using the brightness data (density data) acquired in S7 (S8). By this process of S8, as an example, an average of the values of the brightness of the solid blue patches corresponding to the respective voltage levels is shown in FIG. 10. In FIG. 10, the abscissa represents the adjusted (adjustment) values (−5 to 0 and 0 to +5) showing the respective voltage levels, and the ordinate represents the average of the values of the brightness of the solid blue patches. Incidentally, in the case of this embodiment, as regards the solid blue patches, brightness data with B brightness was used, and as regards the solid black patches, brightness data with G brightness was used. An average brightness value Bave (n) shown in the formula (1) is a parameter which reflects density. The formula (1) shows that at a lower average brightness value Bave (n), the density of the toner image transferred on the recording material S is higher.

(Formula (1))

$$B_{ave}(n) = \frac{1}{M} \times \sum_{m=1}^{M} B(m) \tag{1}$$

Then, the controller 30 calculates a brightness dispersion value of the solid black patches 102 in accordance with a formula (2) appearing hereinafter (S9). Here, an acquiring method of the brightness data used for calculating the brightness dispersion value of the solid black patches 102 will be described using FIG. 11. As shown in FIG. 11, a reading region P is set in an image region of each of the solid black patches 102. In this embodiment, a size of the reading region P was 10 mm×10 mm at a central portion of each patch. In order to calculate the brightness dispersion value, the reading region P is divided into M pieces of regions from P(1) to P(M), and brightness data in the corresponding divided regions of the adjusting chart read in S7 are stored as B(1) to B(M), respectively, in the RAM 33. Each of sizes of the divided regions P(1) to P(M) may be minimum unit of readable resolution by the image reading portion 80 and may be about 300 dpi to 1200 dpi, for example.

In the formula (2) for deriving the brightness dispersion value, "B(m)" represents brightness data of the divided region read "m-th" (m=1 to M) in the solid black patches, and M represents a total number of the divided regions. "$B_{ave}(n)$" represents the average brightness value, and "D(n)" represents the brightness dispersion value of the solid black patches. The brightness dispersion value shown in the formula (2) reflects a transfer property in the case where the recording material S was provided with unevenness. The formula (2) shows that at a larger brightness dispersion value D(n) (dispersion), the transfer property of the toner image from the intermediary transfer belt 44b onto the recording material S varies in larger degree depending on the region, i.e., that a variation in density is larger.
(Formula (2))

$$D(n) = \frac{1}{M} \times \sum_{m=1}^{M} (B(m) - B_{ave}(n))^2 \quad (2)$$

Next, the controller 30 acquires an adjusting value Na at which the average brightness value acquired in S8 becomes lowest (S10). In the case of an example shown in FIG. 10, the brightness becomes smaller with an increasing adjusting value from "−5" toward "+2". In this adjusting value range, the electric field necessary to transfer the solid blue patches becomes insufficient, and the transfer property of the solid blue patches is improved with the increasing adjusting value. The brightness value is minimum at further increased adjusting values "+3 to +4". When the secondary transfer voltage is higher than necessary, a risk of image defect resulting from an electric discharge phenomenon such as the white void increases, and therefore, in this embodiment, a smaller adjusting value "+3" is selected as the adjusting value Na. Acquisition of the adjusting value Na as described above corresponds to selection of a first test voltage relatively large in average density.

Then, the controller 30 checks whether or not the "white void" occurs at the adjusting value Na acquired in S10 (S11). In other words, the controller 30 checks whether or not the "white void" occurs in the solid blue patches formed at the first test voltage selected in S10.

A method of discriminating occurrence or non-occurrence of the "white void" will be described using FIGS. 12 and 13. A relationship between an occurrence status of the white void and the brightness dispersion value (calculated by the method of S9) in the case where the image is formed while changing the secondary transfer voltage by using the image forming apparatus 2 is shown in FIG. 12. Recording materials 1-6 (SHEET 1 to SHEET 6) represent recording materials of different kinds (paper kinds) such as thin paper, plain paper, thick paper, and the like. A white void rank which is the abscissa represents a numerical value by which an occurrence status of the white void is represented by each of five ranks (levels) through eye observation. Specifically, the case where the white void does not occur is represented by a "rank 5", and the white void occurs in a larger amount with a lower numerical value of the ranks, so that the case where the white void occurs in the largest amount is represented by a "rank 1".

As can be understood from FIG. 12, the brightness dispersion value (absolute value) is different depending on the kind (paper kind) of the recording material. Further, as the white void more frequently occurs, a variation in density more frequently occurs, so that the brightness dispersion value increases. In this embodiment, by utilizing this characteristic, an inclination of the brightness dispersion value relative to the adjusting value is acquired, and when the acquired inclination of the brightness dispersion value is larger than an inclination of a predetermined rectilinear line L, discrimination of "white void occurrence" is made. The inclination of the rectilinear line L was "1" on the basis of data.

Details of the discrimination of the "white void occurrence" will be described using FIG. 13. The inclination of a black brightness dispersion value is calculated in the neighborhood of the adjusting value at which an average blue brightness value becomes minimum. Specifically, in this embodiment, an "adjusting value (Na) at which the average blue brightness value calculated in S10 becomes minimum", an "adjusting value (Na−1) smaller than the adjusting value (Na) by 1", and an "adjusting value (Na+1) larger than the adjusting value (Na) by 1" were used. The inclination of an approximate rectilinear line I of the black brightness dispersion value in the above-described adjusting value range is calculated by the method of least square, and when the inclination of the approximate rectilinear line I is larger than the rectilinear line L, the discrimination of the "white void occurrence" is made. In other words, in the case where an increase in density variation of the black solid patches with an increase in secondary transfer voltage in the neighborhood of the first test voltage is a threshold or more, the discrimination of the white void occurrence is made.

In the case of FIG. 13, the inclination of the rectilinear line I is "2.25", and therefore is larger than the inclination (1) of the rectilinear line L, so that the discrimination of the "white void occurrence" is made. Incidentally, in this embodiment, the discrimination is made by the inclination of the density distribution at the adjusting value, and therefore, strictly, the case where a white void rank is made worse by 1 per adjusting value of +1 is discriminated as the "white void occurrence".

In the case where the discrimination of the "white void occurrence" was made (Yes of S11), the controller 30 makes correction of the adjusting value (S12). FIG. 14 shows a relationship between a recording material part voltage of the secondary transfer voltage and the occurrence or non-occurrence of the "white void" in the case where the image on the recording material S was checked with use of the image forming apparatus 2 of this embodiment in an NL environment (temperature: 23° C., humidity: 5%).

As shown in FIG. 14, it turns out that as the thickness of the recording material S becomes thick, the recording material part voltage (absolute value) at which the "white void" occurs becomes larger. According to study by the present inventor, the recording material part voltage at which the "white void" is liable to occur well coincides with an electric discharge start voltage acquired from the Paschen curve in the case where the thickness of the recording material S is regarded as air (gap). That is, the relationship shown in FIG. 14 coincides with cause of occurrence of the "white void" such that the recording material S is discharged during the secondary transfer and the toner at the discharged portion is reversed in charge polarity and thus is not transferred onto the recording material S. Therefore, in this embodiment, by utilizing the above-described correlation, an upper limit of the recording material part voltage is provided depending on the information on the thickness of the recording material S. As a result, it becomes possible to select the adjusting value of the setting voltage of the secondary transfer voltage within a range in which the occurrence of the "white void" can be suppressed.

Specifically, in this embodiment, the controller 30 extracts, from the recording material part voltage Vp(n) acquired in S6, a value which does not exceed the upper limit set depending on the information on the thickness of the recording material S. In this embodiment, every kind (paper category) of the recording material S in the market, such as "thin paper, plain paper, thick paper 1, thick paper 2, . . . ", a relationship between the information (basis weight in this embodiment) on the thickness of the recording material S and the upper limit of the recording material part voltage Vp(n) is acquired in advance. The relationship between the kind of the recording material S and the recording material part voltage Vp(n) is stored, as the table data as shown in FIG. 15, in the ROM 32. The controller 30 makes reference to the table data of FIG. 12 and acquires the upper limit of the recording material part voltage Vp(n) corresponding to the kind of the recording material S acquired in S1.

A conceptual image of the adjusting value correction in this embodiment in the case where the discrimination of the white void occurrence was made is shown in FIG. 16. As shown in FIG. 16, the adjusting value Na calculated at the minimum blue brightness value is "+3", but an adjusting value range in which the recording material part voltage Vp(n) is an upper limit value or less is "+2" or less. In this case, an adjusting value of "+2" which is smallest in adjusting value blue brightness value in the adjusting value range of "+2" or less is employed (as an adjusting value Na'). That is, in the case where the increase in density variation of the solid black patches with the increase in secondary transfer voltage in the neighborhood of the first test voltage is the threshold or more, a second test voltage lower than the first test voltage is employed as the transfer voltage set for during the image formation. This second test voltage is a largest test voltage of a plurality of test voltages in a range in which the second test voltage is lower than a predetermined voltage (an upper limit value of Vb+Vp(n)) determined in advance depending on information on the thickness of the recording material S used for outputting the adjusting chart.

On the other hand, in the case where the discrimination of non-occurrence of the white void was made (S11 of FIG. 8), the adjusting value Na acquired in S10 of FIG. 8 is employed as it is. That is, in the case where the increase in the density variation of the solid black patches with the increase in the secondary transfer voltage in the neighborhood of the first test voltage is the threshold or less, the first test voltage is employed as the transfer voltage for during the image formation.

Next, the controller 30 causes the operating portion 70 to display the "adjusting value Na" or the "adjusting value Na'" acquired as described above at the setting screen 90 (voltage setting portion 91) as shown in FIG. 9 (S13). The operator is capable of discriminating whether or not the displayed adjusting value is appropriate, on the basis of the display contents of the setting screen 90 and the outputted adjusting chart, and is capable of changing the adjusting value depending on the associated case. The operator selects the confirmation portion 94 (OK button 94*a*, application button 94*b*) of the setting screen 90 as it is in the case where the displayed adjusting value is not changed. On the other hand, the operator inputs a desired value to the voltage setting portion 91 of the setting screen 90 in the case where the operator desires that the adjusting value is changed from the displayed adjusting value, and then selects the finalizing portion 94 (OK button 94*a*, application button 94*b*).

The controller 30 discriminates whether or not an adjusting value change instruction is received (S14), and in the case where the adjusting value change instruction is received (Yes of S14), the controller 30 causes the RAM 33 (or the secondary transfer voltage storage/operation portion 31*f*) to store the inputted adjusting value. In the case where the adjusting value is not changed and the confirmation portion 94 is selected (No of S15), the controller 30 causes the RAM 33 (or the secondary transfer voltage storage/operation portion 31*f*) to store the adjusting value determined in S9 (S16). The operation in the adjusting mode is thus ended.

During execution of a subsequent job, the controller 30 calculates the adjusting amount ΔV as "ΔV=(adjusting value)×150 V" depending on the adjusting value stored in the operation in the adjustment mode until the operation in the adjustment mode is subsequently executed, and uses the calculated value in calculation of the secondary transfer voltage Vtr for during normal image formation.

In the case where the adjusting amount used in calculation of the secondary transfer voltage Vtr is determined on the basis of only the average brightness value as in the conventional constitution, the average patch brightness value becomes minimum in some instances at a value not less than the upper limit value of the recording material part voltage, so that there was a liability that an adjusting amount in which there is a possibility of the occurrence of the white void exists. On the other hand, according to this embodiment, the adjusting amount in which there is the possibility of the occurrence of the "white void" is avoided, so that an appropriate adjusting amount can be determined.

Incidentally, the information on the upper limit value of the recording material part voltage Vp(n) used in S12 described above is not limited to use in setting as table data (see FIG. 15) as in this embodiment. For example, a relational expression (not shown) showing a relationship between the information on the thickness of the recording material S and the recording material part voltage Vp(n) at which the "white void" is liable to occur is acquired in advance and can be stored in the ROM 32. In this case, the information on the thickness of the recording material S is acquired and the upper limit value of the recording material part voltage Vp(n) can be acquired from the above-described relational expression.

Further, the information on the thickness of the recording material S is not limited to classification by the kind of the recording material S. For example, in the above-described S1, the operator is capable of directly inputting a value relating to the thickness of the recording material S, such as the thickness or the basis weight. Further, in the step corresponding to S1 (see FIG. 8), the value relating to the thickness of the recording material S, such as the thickness or the basis weight may also be acquired by using a measuring means (not shown) for measuring the value relating to the thickness of the recording material S. As the measuring means, for example, a known thickness sensor using ultrasonic wave may only be required to be provided on a side upstream of the secondary transfer portion N with respect to the process advance direction of the recording material S.

In this embodiment, as the patches for acquiring the average brightness value and the brightness dispersion value, the solid blue patches and the solid black patches were used but are not limited thereto. For example, instead of the solid blue patch, a solid patch of red or green which is a secondary color can be used, and a solid patch of a single color of yellow, magenta, cyan or black can be used. However, use of a thick color such as black (single color) is advantageous for discriminating the occurrence or non-occurrence of the "white void".

In this embodiment, the case where the operation by the operator is performed through the operation portion 70 of the image forming apparatus 2 and thus the operation in the adjustment mode is executed was described as an example, but the operation in the adjustment mode may also be executed by operation through external device 20 such as a personal computer. In this case, it is possible to make setting similar to the above-described setting, through the setting screen displayed at the display portion of the external device 200, by a driver program for the image forming apparatus 2 installed in the external device 200.

In this embodiment, the information on the electric resistance of the secondary transfer portion N from a start of the operation in the adjustment mode when the recording material S is absent in the secondary transfer portion N was acquired. As a result, the information on the electric resistance of the secondary transfer portion N in conformity with a situation when the adjusting amount for setting of the secondary transfer voltage is acquired can be acquired. However, if allowed from the viewpoint of accuracy or the like, as the information on the electric resistance of the secondary transfer portion N, for example, a result of ATVC at the time of a start of the last job in which the operation in the adjustment mode is executed may also be used.

In this embodiment, in the operation in the adjustment mode, control using display of the adjusting value corresponding to the adjusting amount $\Delta V$ was carried out, but control more directly using the display of the adjusting amount $\Delta V$ may also be carried out.

In this embodiment, when the voltage-current relationship is acquired, the value of the current flowing during supply of the predetermined voltage was detected, but a value of the voltage generating during supply of a predetermined current value may also be detected.

Further, the rank itself used for the white void discrimination is based on eye observation evaluation by the present inventors, and may be based on different criteria. Further, the method of discriminating the white void with use of the brightness dispersion value is not limited to the above-described method in this embodiment, but for example, it is also possible to employ a method of discriminating the white void by a difference in brightness distribution between adjusting values before and after the occurrence of the white void, not the inclination. Further, the adjusting values used for the discrimination were Na, Na−1, and Na+1, but values other than these (three) values may be used.

As described above, in this embodiment, the occurrence or non-occurrence of the "white void" was discriminated on the basis of the density of the patches formed on the adjusting chart, and the adjusting amount $\Delta V$ was capable of being made different between the case where the "white void" occurred in the patch and the case where the "white void" did not occur. In the case where the "white void" occurs, compared with the case where the "white void" does not occur, the adjusting amount $\Delta V$ is suppressed to a lower level. By this, the secondary transfer voltage determined by the "(secondary transfer voltage Vp)+(adjusting amount $\Delta V$)" is adjusted depending on the occurrence or non-occurrence of the "white void". Accordingly, in the constitution in which the image forming apparatus 2 is operable in the adjusting mode in which the secondary transfer voltage set for during the image formation is adjusted on the basis of the adjusting chart on which the patches are formed, the secondary transfer voltage can be adjusted to a secondary transfer voltage at which suppression of the occurrence of the "white void" and suppression of the occurrence of "image density lowering" can be compatibly realized.

Second Embodiment

Next, an image forming apparatus according to a second embodiment will be described. In the image forming apparatus according to the above-described first embodiment, in the case where the white void occurs in the adjusting chart, the adjusting value was lowered so as to be adjusted to the secondary transfer voltage at which the white void occurrence risk is low. However, with the lowering in adjusting value, the secondary transfer voltage is liable to be set at a low value, whereby these was a liability that the density of the secondary-color lowers.

In view of this, in the second embodiment, during operation in the adjusting mode, the operator is capable of selecting whether priority is given to ensuring the density of the secondary-color although there is a liability of the occurrence of the white void or to suppressing the white void although there is a liability of the occurrence of the lowering in density of the secondary-color.

Figure 2:
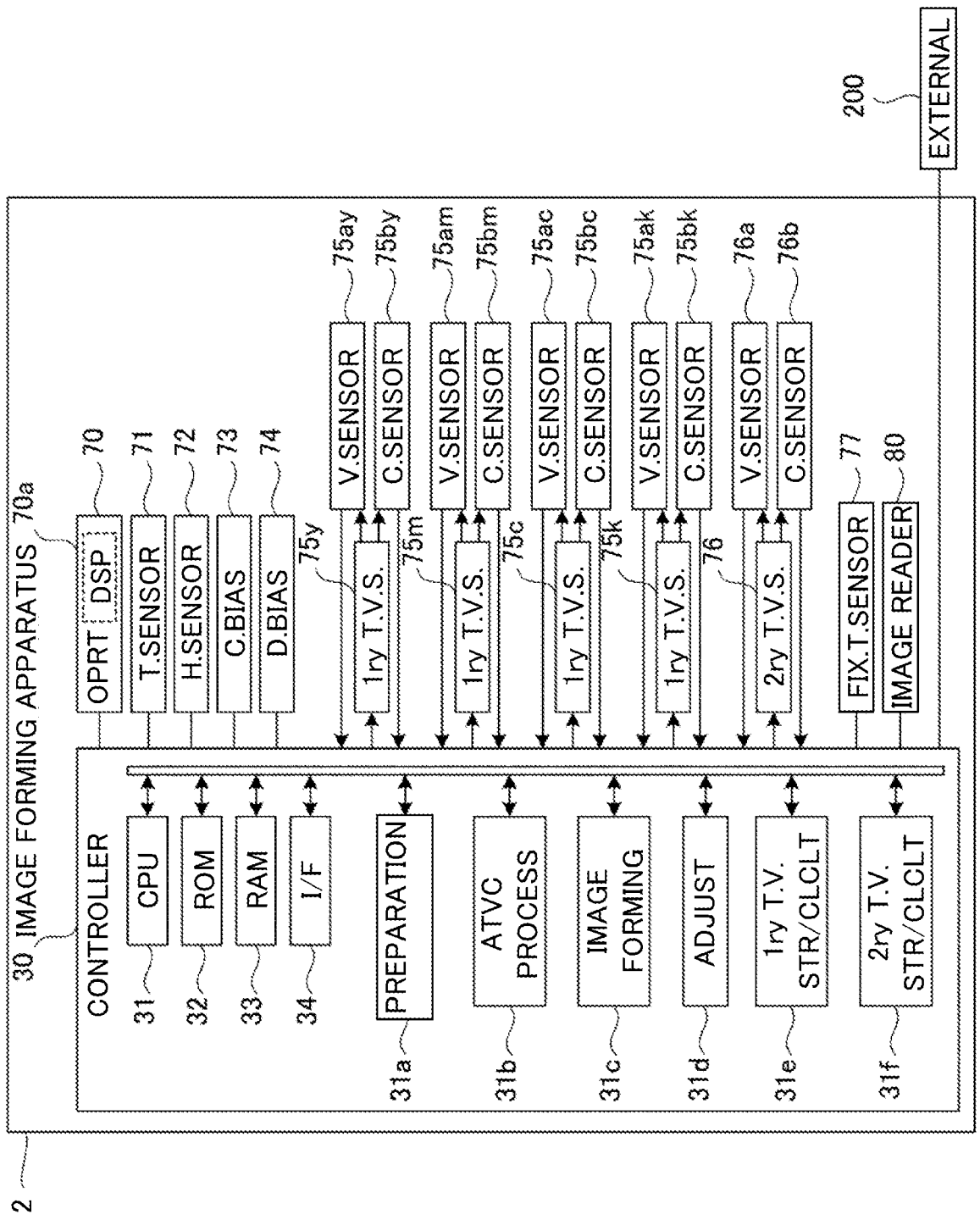
FIG. 2 is a block diagram showing a schematic structure of a control system of the image forming apparatus.

The operation in the adjusting mode in the second embodiment will be described using FIGS. 17 to 19 while making reference to FIGS. 1 and 2. FIG. 17 is a flowchart showing the operation in the adjusting mode in the second embodiment. FIG. 18 is a schematic illustration showing an example of a setting screen of the operation in the adjusting mode. Incidentally, in the flowchart shown in FIG. 17, processes identical to the processes in the operation in the adjusting mode (see FIG. 8) in the above-described first embodiment are represented by the same reference symbols, and in the following, processes different from the operation in the adjusting mode in the first embodiment will be principally described.

As shown in FIG. 17, first, designation of the recording material S and settings of the center voltage and double-side printing are performed similarly as in the first embodiment (S1, S2). In this embodiment, advanced setting 96 is added to the setting screen of FIG. 18, and when the operator selects the advanced setting 96, the controller 30 (adjustment process portion 31d) causes the operating portion 70 to display an advanced setting screen 90b shown in FIG. 19.

In the advanced setting screen 90b of FIG. 19, in priority image selection 97, whether priority is given to output of a "high-density image" or a "halftone image" is capable of being inputted. The "high-density image" refers to an image, such as a so-called solid image or an image of a secondary-color (red, blue, green), for which the toner is used in a large amount and for which a large transfer voltage is needed. The "halftone image" refers to an image of which color is principally a pale color and of which toner application amount per unit area of the recording material S is relatively small. The white void is liable to be visualized in the case of the halftone image, and therefore, in the case where the "halftone" is selected in the priority image selection 97, correction for during the occurrence of the white void is made.

The operator selects a priority image and then selects a confirmation portion 98 of the advanced setting screen 90b. The controller 30 causes the RAM 33 or the like to store the setting inputted by the operator (S100). After the advanced setting is completed, the sequence returns to the setting screen 90a of FIG. 18, and the controller 30 carries out the processes (S3 to S10) to the calculation of the minimum brightness adjusting value (S10) similar to the processes in the first embodiment.

Then, in the case of the second embodiment, before occurrence or non-occurrence of the white void is discriminated (S11), the controller 30 discriminates whether the priority image is the "high-density image" or the "halftone" image (S101). In the case where the priority image is the "halftone" image (Yes of S101), the controller 30 makes discrimination of the occurrence or non-occurrence of the white void similarly as in the case of the first embodiment (S11). On the other hand, in the case where the priority image is the "high-density image" (No of S101), the controller 30 does not make the discrimination of the occurrence or non-occurrence of the white void, and the sequence jumps to S13. By such a discrimination flow, depending on the priority image inputted by the operator, an appropriate secondary transfer voltage can be set. Thereafter, a flow similar to the flow in the first embodiment is performed, and then the operation in the adjusting mode is ended.

Thus, the secondary transfer voltage can be easily adjusted to an optimum secondary transfer voltage corresponding to a desired use status by causing the operator to select whether priority is given to the suppression of the lowering in secondary-color density or to the suppression of the occurrence of the white void, and thus is preferred.

Incidentally, in this embodiment, the selection of the priority image is made on the setting screen 90a (S100), but the present invention is not limited thereto. For example, the operator may select the priority image on the basis of image information (image information from the image reading portion 80 or the external device 200 (see FIG. 2)) of the image to be actually intended to be outputted by the operator. Then, in the case where halftone image information is contained in a large amount in the image information, the process for during the white void occurrence (see FIG. 12) may be performed.

Incidentally, in the above-described embodiments, the image forming apparatus 2 of the intermediary transfer type in which the toner images are primary-transferred from the photosensitive drums 51y to 51k for the respective colors onto the intermediary transfer belt 44b and thereafter are secondary-transferred from the intermediary transfer belt 44b onto the recording material S was described as an example, but the present invention is not limited thereto. The above-described embodiments are also applicable to an image forming apparatus of a direct transfer type in which the toner images are directly transferred, onto the recording material S, from the photosensitive drums 51y to 51k, for the respective colors, which rotate while carrying the toner images.

According to the present invention, in the case of the constitution in which the operation in the adjusting mode in which the transfer voltage set for during the image formation is adjusted on the basis of the test chart on which the plurality of the test images are transferred, the transfer voltage is capable of being adjusted to the transfer voltage at which the suppression of the occurrence of the "white void" and the suppression of the occurrence of the "lowering in image density" are compatibly realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-059836 filed on Mar. 31, 2021, which is hereby incorporated by reference herein in its entirety.

What is claimed is:

1. An image forming apparatus comprising:
an image bearing member configured to bear a toner image;
a transfer device configured to transfer the toner image from the image bearing member to a recording material;
an applying portion configured to apply a voltage to the transfer device;
a detecting portion configured to detect an image on the recording material onto which the image is transferred by the transfer device;
a controller configured to execute an operation in a setting mode in which, during non-image formation, a plurality of test images are transferred onto the recording material under application of different test voltages to the transfer device and then a transfer voltage to be applied to the transfer device during image formation is set on the basis of detection results detected by the detecting portion regarding the test images transferred onto the recording material; and
an operating portion configured to manually input instructions,
wherein the operating portion is configured to allow input of instructions specifying a mode to be executed from among multiple modes, including a first mode and a second mode, in executing the setting mode,
wherein the first mode is a mode in which, in executing the setting mode, a first transfer voltage is capable of being set as the transfer voltage to be applied when an image is transferred to a first side of a recording material, based on the detection results obtained by the detecting portion from detecting the plurality of test images, and
wherein the second mode is a mode in which, in executing the setting mode, a second transfer voltage different from the first transfer voltage is capable of being set as the transfer voltage to be applied when the image is transferred to the first side of the recording material, based on the detection results obtained by the detecting portion from detecting the plurality of test images which are formed under the same condition as that in the first mode.

2. The image forming apparatus according to claim 1, wherein the first mode is a mode in which priority is given to a halftone image.

3. The image forming apparatus according to claim 1, wherein the second mode is a mode in which priority is given to a solid image or a secondary-color image.

4. The image forming apparatus according to claim 1, wherein a value of the first transfer voltage set in the first mode is less than a value of the second transfer voltage set in the second mode.

* * * * *